(12) United States Patent
Yamada

(10) Patent No.: US 6,654,061 B2
(45) Date of Patent: *Nov. 25, 2003

(54) AUTOMATIC FOCUS ADJUSTING APPARATUS AND METHOD UTILIZED BY AN IMAGE SENSING APPARATUS

(75) Inventor: Kunihiko Yamada, Tanashi (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/661,944

(22) Filed: Jun. 11, 1996

(65) Prior Publication Data

US 2001/0045990 A1 Nov. 29, 2001

(30) Foreign Application Priority Data

Jun. 14, 1995 (JP) ............................................... 7-147652
Jul. 21, 1995 (JP) ............................................... 7-185667

(51) Int. Cl.$^7$ ............................................... H04N 5/232
(52) U.S. Cl. ...................................... 348/355; 348/354
(58) Field of Search ................................. 348/355, 353, 348/354, 364, 365, 363, 361, 360, 336, 342, 344, 345, 349, 356, 335, 340, 218, 219, 218.1, 219.1; 359/483, 489, 493, 494, 495, 497, 498, 319; 396/385, 382, 354, 352, 334, 447, 79, 82, 91

(56) References Cited

U.S. PATENT DOCUMENTS

| | | | | |
|---|---|---|---|---|
| 3,588,224 A | * | 6/1971 | Pritchard | 359/498 |
| 3,838,906 A | * | 10/1974 | Kumada | 359/249 |
| 4,190,330 A | * | 2/1980 | Berreman | 349/200 |
| 4,381,523 A | * | 4/1983 | Eguchi et al. | 348/350 |
| 4,575,193 A | * | 3/1986 | Greivenkamp, Jr. | 348/336 |
| 4,626,897 A | * | 12/1986 | Sata et al. | 359/495 |
| 4,758,070 A | * | 7/1988 | Nishimoto | 359/319 |
| 4,783,152 A | * | 11/1988 | Nishimoto | 359/319 |
| 4,992,859 A | * | 2/1991 | Yoshida | 348/355 |
| 5,004,902 A | * | 4/1991 | Matsui et al. | 250/201.8 |
| 5,047,847 A | * | 9/1991 | Toda et al. | 348/68 |
| 5,097,282 A | * | 3/1992 | Itoh et al. | 348/345 |
| 5,115,262 A | * | 5/1992 | Komiya | 348/352 |
| 5,135,183 A | * | 8/1992 | Whitney | 244/3.16 |
| 5,148,010 A | * | 9/1992 | Mori | 250/201.5 |
| 5,150,217 A | * | 9/1992 | Senuma et al. | 348/353 |
| 5,325,146 A | * | 6/1994 | Toji | 348/353 |
| 5,337,106 A | * | 8/1994 | Jutamulia et al. | 396/354 |
| 5,614,951 A | * | 3/1997 | Lee et al. | 348/355 |
| 5,657,164 A | * | 8/1997 | Shuman | 359/494 |
| 5,825,022 A | * | 10/1998 | Takekoshi et al. | 250/225 |
| 5,949,480 A | * | 9/1999 | Gerhart et al. | 348/135 |

\* cited by examiner

*Primary Examiner*—Aung S. Moe
(74) *Attorney, Agent, or Firm*—Morgan & Finnegan, LLP

(57) ABSTRACT

A focus adjusting apparatus of an optical image formation system performs focus adjustment by: splitting light coming from an object into at least two rays along light paths of different lengths and projecting an image of the object; sensing the split rays and converting them into an image signal; filtering a first signal component out of the image signal and outputting a first value corresponding to an amount of the first signal component; filtering a second signal component, having a frequency different from the first signal component, out of the image signal and outputting a second value corresponding to an amount of the second signal component; judging a focus condition of the projected image by comparing the first value with the second value; and controlling the optical system to adjust the focus condition in accordance with a signal derived from the judging step.

9 Claims, 21 Drawing Sheets

IMAGE FORMATION EXAMPLE 1
(D1 < D2)

PROJECTED IMAGE 1

IMAGE FORMATION EXAMPLE 2
(D1 > D2)

PROJECTED IMAGE 2

IMAGE FORMATION EXAMPLE 3
(D1 > D2)

PROJECTED IMAGE 3

IMAGE FORMATION EXAMPLE 4
(D1 < D2)

IMAGE FORMATION EXAMPLE 5
(D1 > D2)

IMAGE FORMATION EXAMPLE 6

IMAGE FORMATION EXAMPLE 7

IMAGE FORMATION EXAMPLE 8

IMAGE FORMATION EXAMPLE 9

IMAGE FORMATION EXAMPLE 10

AUTOMATIC FOCUS ADJUSTING APPARATUS AND METHOD UTILIZED BY AN IMAGE SENSING APPARATUS

BACKGROUND OF THE INVENTION

The present invention relates to an automatic focus adjusting apparatus and method utilized by an image sensing apparatus which performs focusing by adjusting draw-out amount of an object lens by using image signals obtained from an image sensor.

A conventional automatic focus adjusting apparatus discriminates whether an image of an object is in focus or out of focus on the basis of high-frequency component signals extracted from image signals by using a band-pass filter, and the like, and on signals representing edge parts of the image extracted by using a differential circuit. More specifically, the image signals representing an image in focus are obtained by moving the position of a lens so that the above extracted signals have the maximum intensity (power). The method adopted by the above conventional apparatus is explained in detail in "Automatic Focus Adjustment of a Television Camera in Climbing Servo Method" (Ishida et al.) published in "NHK Technical Research, Vol. 17, 1st issue" (1965). Referring to FIG. 1, the climbing servo method will be briefly described below.

In FIG. 1, reference numeral 1 denotes a lens; 2, an image sensor; 3, a preamplifier for amplifying voltages of image signals detected by the image sensor 2; 4, a signal processing circuit; 5, a band-pass filter (abbreviated as "BPF", hereinafter) which transmits an image signal component in a predetermined frequency band; 6, a detector; 7, a microcomputer responsible for focus control; 8, a motor driver; and 9, a motor.

An image of an object is projected on the photosensing surface of the image sensor 2 by the lens 1, and electric signals converted from the optical image are obtained by the image sensor 2. The image signal is amplified to an appropriate level by the preamplifier 3, then, converted into a standardized image signal, such as NTSC, by the signal processing circuit 4. The output from the preamplifier 3 also enters the BPF 5, where a high-frequency component included in the image signal is extracted. Further, the high-frequency component is inputted to the detector 6, thereby obtaining output corresponding to "power" of the high-frequency components.

The resolution of the image projected on the photosensing surface of the image sensor 2 by the lens 1 depends on how well the image is focused. More specifically, when the focal point of the lens 1 projecting the image is on the photosensing surface of the image sensor, the resolution reaches its maximum, and, as the distance between the photosensing surface and the focal point of the lens 1 (the distance is referred as "defocused amount", hereinafter) becomes larger, the resolution drops.

FIG. 2 is a graph showing changes of MTF (Modulation Transfer Function) for states of an image projected by the lens 1 when the image is focused, lightly defocused and largely defocused. As shown in FIG. 2, as the state of the image approaches the focused state (i.e., the defocused amount becomes smaller), high resolution is achieved over a frequency range extending to higher spatial frequencies. In contrast, as the state of the image is more defocused (i.e., the defocused amount becomes larger), the spatial frequency to which the image is possibly resolved becomes low. This relationship corresponds to that between the amplitude and the frequency of an image signal. In other words, as the state of image approaches the focused state, the amplitude of a high frequency component of an image signal becomes large, whereas, as the state of the image approaches the highly defocused state, an amplitude of the high frequency component of the image signal becomes small.

Therefore, as shown in FIG. 3, the output from the detector 6 alters depending upon the draw-out amount of the lens 1, and has its peak at a specific point. This is because the focusing state of an image projected on the photosensing surface of the image sensor 2 changes as the draw-out amount of the lens 1 alters, and the intensity of a high-frequency component in a signal which is converted from the image by the image sensor 2 reaches its maximum since the projected image is clearest in the focused state.

The microcomputer 7 inputs the output from the detector 6, calculates the driving direction and driving velocity, which are to be applied to the motor 8, which maximize the output from the detector 6. Then the microcomputer 7 controls the rotational direction and the rotational velocity of the motor 9 through the motor driver 8. Thereafter, the microcomputer 7 controls to stop the motor 8 at a position where the output from the detector 6 reaches its maximum. As described above, an image is focused by controlling the draw-out amount of a lens of a video camera.

In this method, if a lens has been drawn out initially to a position illustrated by the point A in FIG. 3, for example, in order to draw out the lens to the point B at which the image is focused, the lens has to be moved in either the direction toward the point at which the focal distance is infinite or in the direction toward the point at which the focal distance is the minimum after deciding the driving direction. Note, the term, "climbing method" is named since the output from the detector 6 has a locus as if "climbing a mountain" with respect to the draw-out position, as shown in FIG. 3.

In such a case, when the lens is moved from the point A toward a point at which the focal distance is infinite, it can be simply moved to the point B as shown in FIG. 3, however, when the lens is moved toward a point at which the focal distance is the shortest, the direction of the movement must be reversed after confirming that the output from the detector 6 drops when the lens 1 is moved in the original direction.

Further, even though the lens is moving toward the point B, it is impossible to determine that the output from the detector 6 has reached its maximum at the point B when the lens has arrived at the point B. Therefore, it is necessary to move the lens in such a manner that the lens once passes the point B, and the drop of the output from the detector 6 is confirmed at a point C, then the lens is moved back to the point B.

The aforesaid operations have to be performed since one cannot know if the lens are currently in the focused state or not, or if the lens pass the peak and are being drawn out in the direction toward the point where the focal length is infinite (referred as "rear-focused state", hereinafter), or if the lens pass the peak and are being drawn out in the direction toward the point at which the focal length is the shortest (referred as "front-focused state", hereinafter) without monitoring the change of the output from the detector 6. However, the aforesaid operation is not preferable so as to find the focused state and set the lens in the focused state automatically, effectively and smoothly.

In contrast with the "climbing" method as described above, a "wobbling" method has been proposed. In the "wobbling" method, how well an image of an object is focused (referred as "focusing state", hereinafter) on the photosensing surface is determined by slightly vibrating a part of a lens system or an image sensor (referred as "wobbling operation", hereinafter) in the direction of the optical axis at a predetermined period by using a driving system other than the driving system used for focusing. The wobbling method is disclosed in detail in the Japanese Patent Laid-Open No. 58-188965 by Kitamura et al., for instance. In the wobbling method, whether the image is focused or not, or whether the image is in a rear-focused state or in a front-focused state can be discriminated without driving the lens system by a motor. Accordingly, an image can be focused effectively and smoothly comparing to the aforesaid "climbing method". However, since the mechanism for vibrating the lens system or the image sensor is complicated, it is expensive.

In contrast, a "step driving" method which uses a driving mechanism such as a stepping motor, that can easily position-control the lens for focusing operation has been proposed, and is mainly used at present. In the "step driving" method, the aforesaid wobbling operation is performed by this driving mechanism in parallel.

In the "wobbling" method and the "step driving" method, however, although the wobbling operation for determining a focusing state of lens system is performed by vibrating in a very small amplitude so that a user can not recognize the vibration when he or she is looking into the view finder of the image sensing apparatus, the obtained image signals has to include some noises. Therefore, in order to determine whether the lens is in front-focused state or in rear-focused state for sure, it is necessary to perform an averaging operation over signals obtained by a wobbling operation for a considerably long time. As a result, there arises a problem in which the "wobbling operation" has to be performed for a long time. Further, after the averaging operation, a focusing operation should be performed by moving the lens toward the point where an focused image can be obtained. Thus, it takes quite a long time before the entire image is focused.

Furthermore, according to the aforesaid two methods using the wobbling operation, even if the amplitude of the vibration is set small, a sensed image, especially near the center of the focused point in the image, is sensitively affected by the very small amplitude of the vibration. Therefore, an image of good quality may not be obtained.

Further, the position of the object usually changes time after time, after the image of the object is once focused, thus it is necessary to perform the wobbling operation continuously or periodically to check whether the lens system is still in the position capable of forming the image in the focused state. This operation requires to supply electric power continuously to the driving system, which consumes considerable electric energy, thus not preferable. In addition, the driving system for performing operation including wobbling as described above requires driving velocity, driving torque and driving precision, for example, which correspond to the performance. Accordingly, it is difficult to down-size the system, and the price of the system would be high.

SUMMARY OF THE INVENTION

The present invention has been made in consideration of the above situation, and has as its object to provide a focus adjusting apparatus capable of realizing a fast and smooth automatic focusing operation, decreasing the size and lowering the manufacturing cost, an image sensing apparatus having this focus adjusting apparatus, and an optical system for focus adjustment.

It is another object of the present invention to provide an automatic focus adjusting apparatus and an image sensing apparatus capable of performing focus adjustment by splitting light coming from a single light source into two rays so as to give different light paths to these two rays intentionally, and filtering image signals obtained via sensing these two rays to obtain an focused image.

It is further object of the present invention to provide an image sensing apparatus and an focus adjusting apparatus utilizing a birefringent plate for splitting light into at least two rays having different light paths.

It is yet further object of the present invention to provide an image sensing apparatus and an focus adjusting apparatus utilizing a mirror for splitting light into plural rays having different light paths.

It is yet further object of the present invention to provide an image sensing apparatus and a focus adjusting apparatus capable of canceling image signal components based on a defocused image out of a superposed image signal based on a plurality of images projected by plural rays.

It is yet further object of the present invention to provide an image sensing apparatus having two filters for judging an image formation state, where the output from one of the two filters is to be an image signal of a focused image.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

The present invention will be described in detail in preferred embodiments which illustrate cases where the present invention is applied to an automatic focus adjusting mechanism of an image sensing apparatus, in accordance with the accompanying drawings.

When an image projected by two rays emitted from a single light source is the photoelectric-converted by using an image sensing device, photoelectric converter generates image signals on the basis of the two rays superposed (the image signals are referred as "composite signals", hereinafter). A focus adjusting control of the present invention utilizes these composite signals. In order to generate two different rays out of light emitted from a single light source, a birefringent plate is used in the first embodiment, and a mirror is used in the second embodiment.

The first embodiment utilizes "birefringence phenomena", or more specifically, two refracted rays obtained as a result of the birefringence phenomena, which can be observed when light passes through a crystal having optical anisotropy. The two groups of refracted rays are ordinary rays and extraordinary rays when a uniaxial crystal is used, and are two extraordinary rays when a biaxial crystal is used. The second embodiment utilizes more than two reflected rays generated between two parallel interfaces of a plane mirror.

<First Embodiment> Birefringence

Figure 4:
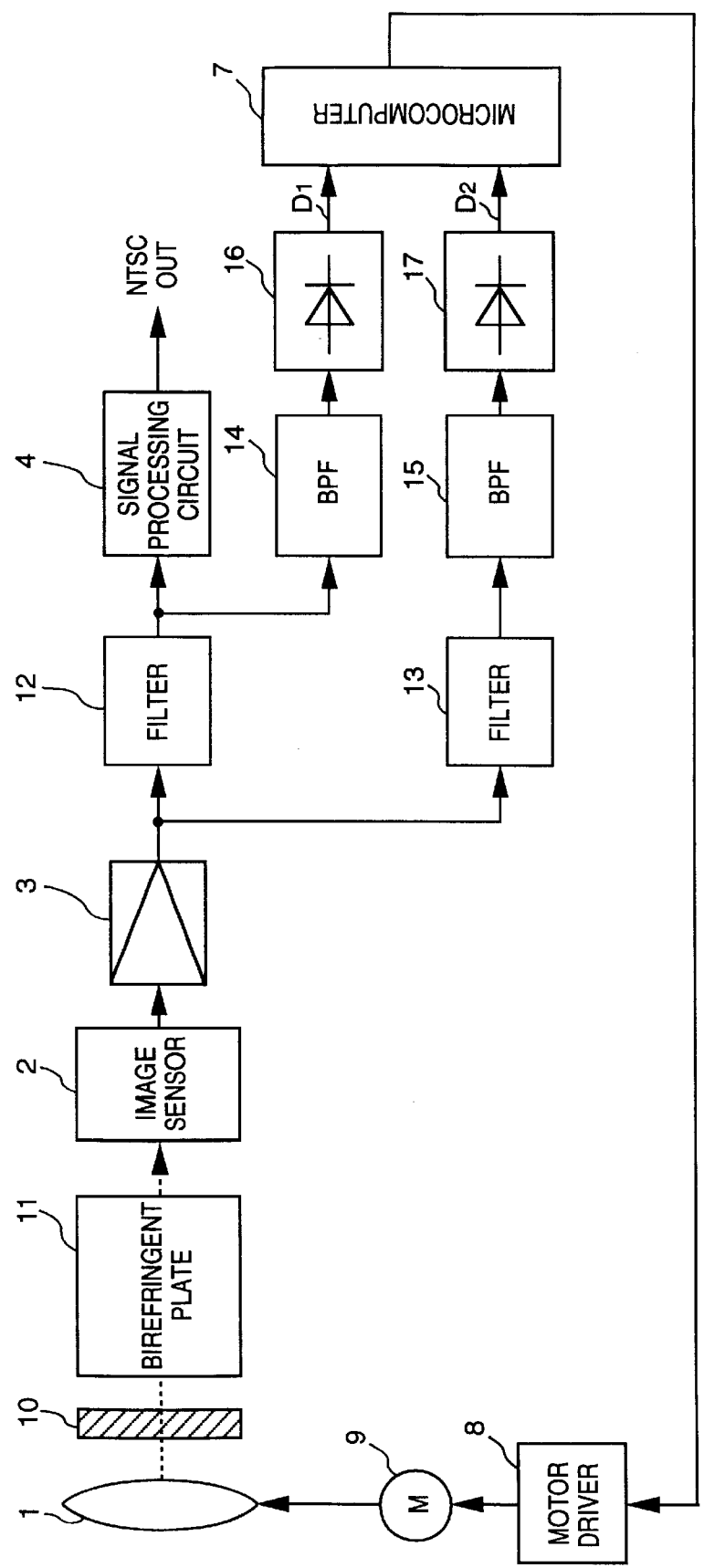
FIG. 4 is a block diagram illustrating a configuration of an image sensing apparatus and focus adjusting apparatus according to a first embodiment.

FIG. 4 is a block diagram illustrating a configuration of an image sensing apparatus according to a first embodiment.

Figure 1:
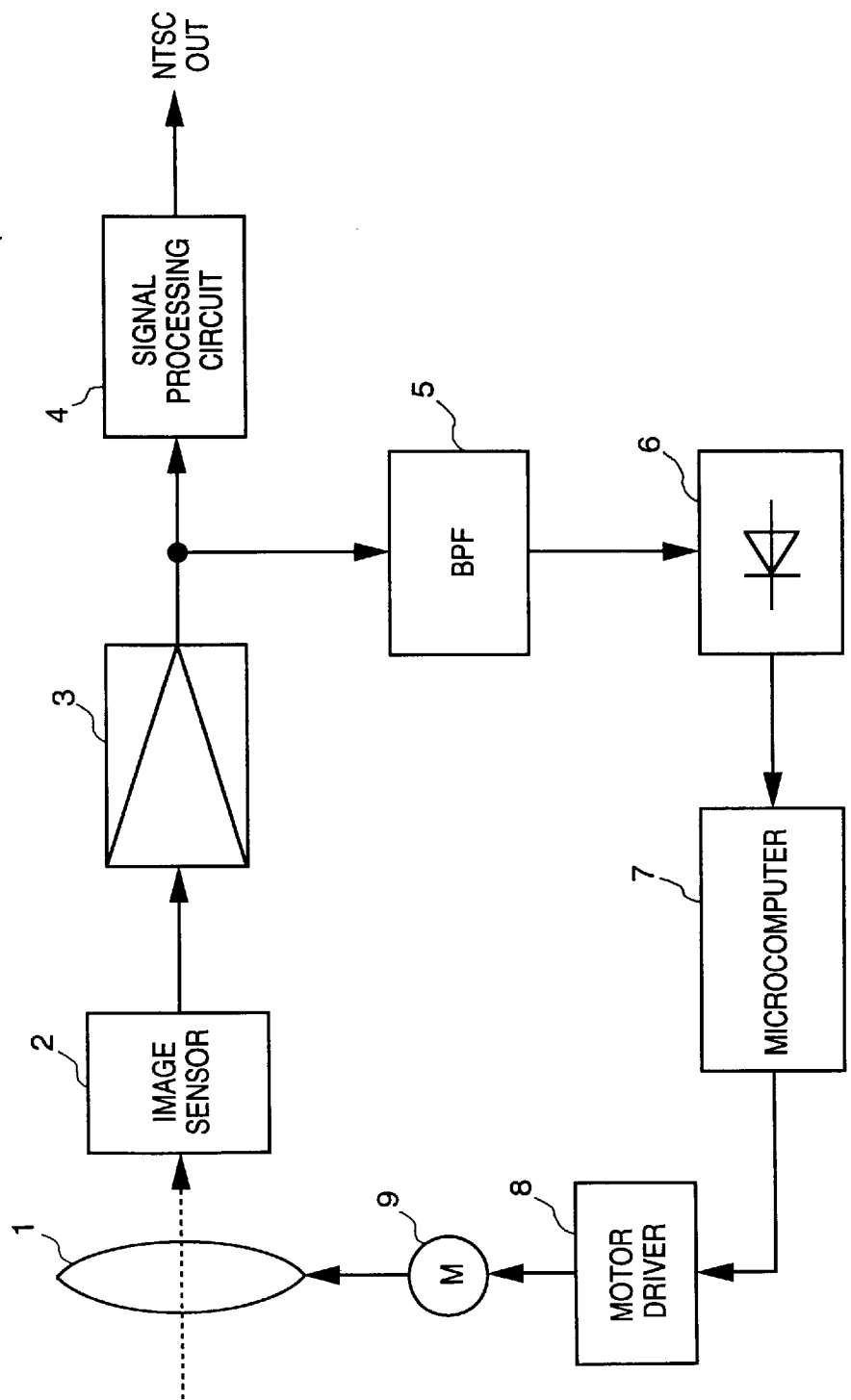
FIG. 1 is a block diagram illustrating a configuration of a conventional image sensing apparatus and focus adjusting apparatus.

In FIG. 4, reference numerals 1, 2, 3, 4, 7, 8 and 9 denote the same elements and units as those in FIG. 1, and explanations of those are omitted. Reference numeral 10 denotes a polarizing filter and reference numeral 11 denotes a light-transmission plate made of a crystal having optical anisotropy (birefringent plate). The birefringent plate splits a light beam into two components. If the plate is made of a uniaxial crystal, the two groups of split rays are respectively called ordinary rays and extraordinary rays. The uniaxial crystal is used as an example in the first embodiment.

Reference numerals 12 and 13 denote digital filters. The filters may be substituted by analog filters. Image signals of an image projected on the image sensor 2 are composite signals of a composite image consisting of the ordinary rays and the extraordinary rays. As will be described later in detail, the filters 12 and 13 implement function to distill image signals of an image projected only by the ordinary rays by canceling image signals of the image projected by the extraordinary rays from the composite signals.

BPFs 14 and 15 respectively extract components of signals in a high frequency range from signals outputted from the digital filters 12 and 13. Detectors 16 and 17 detect whether or not the signal components in the high frequency range are included in the signals outputted from the digital filters 12 and 13. Output signals $D_1$ and $D_2$ from the detectors 16 and 17 respectively enter the microcomputer 7. The microcomputer 7 controls a motor used for focus adjustment on the basis of the output signals $D_1$ and $D_2$.

It should be noted that an additional birefringent plate which is usually placed just in front of the image sensor 2 is not provided in the apparatus of FIG. 4. Because light which would transmit the polarization filter 10 and the birefringent plate 11 would be polarized to enter into the additional plate, the additional birefringent plate would not function as an optical low-pass filter.

If light from a single object is split into two groups of refracted rays by birefringence, then image signals obtained by photoelectric-conversion of the two groups of refracted rays are composite signals of image signals based on the ordinary rays and image signals based on the extraordinary rays. Both of the digital filters 12 and 13 are designed so as to distill only the image signals based on the ordinary rays. Further, the signals outputted from the digital filters 12 and 13 will be in different frequency ranges depending upon whether the projected image based on the ordinary rays is in the "front-focused" state or in the "rear-focused" state, as will be described later. The BPFs 14 and 15 detect how much signal components in a predetermined frequency range are contained in respective outputs from the filters 12 and 13.

<Type of the Image Formation States> . . . First Embodiment

In the first embodiment as shown in FIG. 4, an image of an object which passed through the lens 1 and the polarizing filter 10 becomes a superposed image made of two images of the object projected on the photosensing surface of the image sensor 2 after being transmitted through the birefringent plate. This will be described more in detail with reference to FIG. 5.

Figure 5:
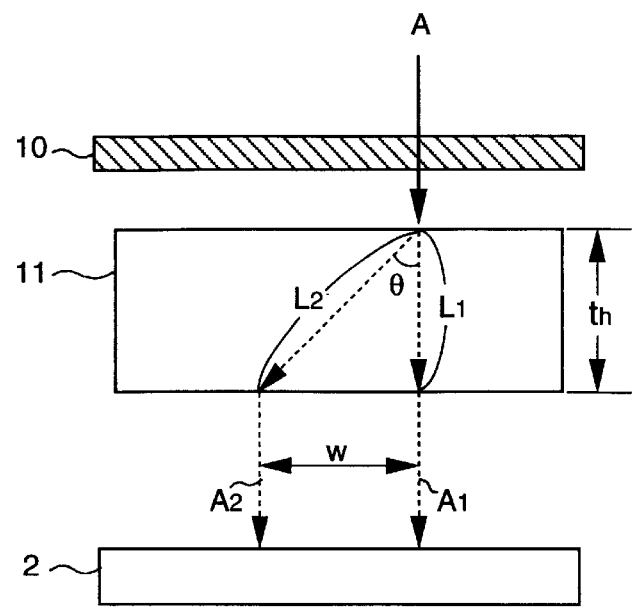
FIG. 5 depicts a light path of light passing through a birefringent plate according to the first embodiment.

In FIG. 5, a solid line A indicates an incoming ray, a dashed line $A_1$ indicates an ordinary ray of the ray A split in accordance with the birefringence phenomena, and a dashed line $A_2$ indicates an extraordinary ray of the ray A. More specifically, when the incoming ray A which had passed through the polarizing filter 10 enters the birefringent plate 11, it is split into the ordinary ray $A_1$ and the extraordinary ray $A_2$ which are polarized in the orthogonal directions to each other. If the incoming light A is not polarized the quantity of light (i.e., intensity) of the ordinary ray $A_1$ and the quantity of light of the extraordinary ray $A_2$ are identical.

However, since the polarizing filter 10 is provided in front of the birefringent plate 11 in the image sensing apparatus in the first embodiment, the incoming light A which enters the birefringent plate 11 has been polarized. Therefore, the quantity of the ordinary ray $A_1$ and the quantity of the extraordinary ray $A_2$ differ by an amount which depends on the polarization direction of the polarizing filter 10 and an extinction ratio. Now, denoting the quantity of the ordinary ray $A_1$ by $F_1$, the quantity of the extraordinary ray $A_2$ by $F_2$, and the extinction ratio of the polarizing filter 10 by k, and assuming that the polarization direction of the polarizing filter 10 is identical to the polarization direction of the ordinary ray $A_1$, then, the relationship between k, $F_1$ and $F_2$ can be expressed by the following equation (1).

$$k = \frac{F_2}{F_1} \quad (1)$$

Further, the angle formed between the ordinary ray $A_1$ and the extraordinary ray $A_2$ is denoted by $\theta$ and the thickness of the birefringent plate 11 by th, then the distance, w, between the position on the photosensing surface of the image sensor 2 where the ordinary ray $A_1$ incidents and the position where the extraordinary ray $A_2$ incidents can be written as, $$w = th \times \tan\theta \quad (2)$$

Further, the difference $\Delta L$ between the length of light path of the ordinary ray $A_1$ and the length of light path of the extraordinary ray $A_2$ can be expressed as, $$\Delta L = L_2 - L_1 = th \times \left(\frac{1}{\cos\theta} - 1\right) \quad (3)$$

The ordinary ray $A_1$ and the extraordinary ray $A_2$ are originated from an identical light source, however, since there is the difference, $\Delta L$, in the length of the light path between them, the focal points of the two rays differ from each other.

Figure 6:
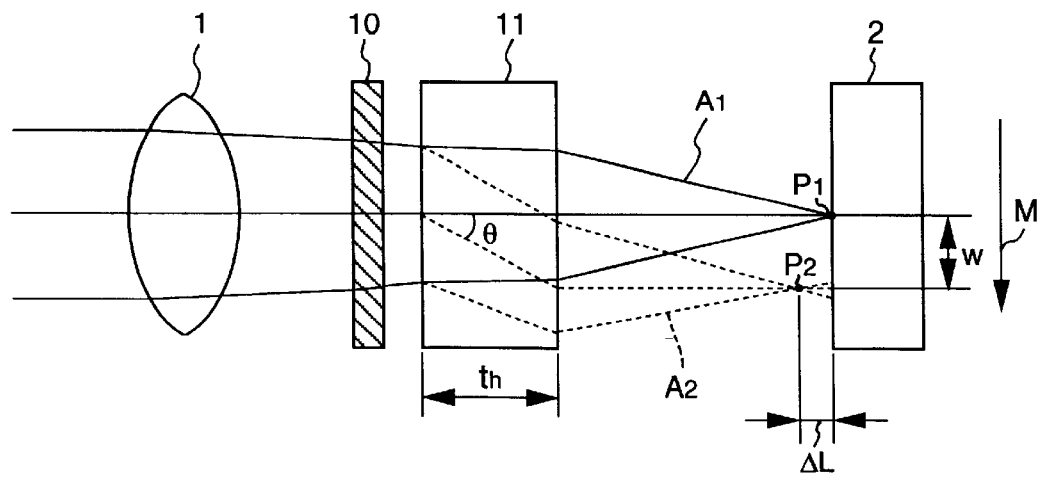
FIG. 6 depicts an optical system in detail according to the first embodiment.

FIG. 6 is an explanatory view showing that two sets of refracted rays focus at different points. In FIG. 6, solid lines $A_1$ indicate luminous flux of ordinary rays representing an image of an object, and dashed line $A_2$ indicates luminous flux of extraordinary rays representing the same image of the object. The image of the object which passed through the lens 1 further passes through the polarizing filter 10, thereafter split into two of the same images by the birefringent plate 11. Then, the projected image of the object represented by the ordinary rays $A_1$ is focused at the point $P_1$ as shown in FIG. 6, while the projected image of the object represented by the extraordinary rays $A_2$ is focused at the point $P_2$. In this case, since the length of the light path $L_2$ of the extraordinary ray $A_2$ to the photosensing surface of the image sensor 2 is longer than the length $L_1$ of the ordinary ray $A_1$ by $\Delta L$, as described above. Therefore, the focal point $P_2$ is closer to the lens 1 than the focal point $P_1$ by the distance $\Delta L$. More specifically, in a case where the projected image represented by the ordinary rays $A_1$ is focused on the photosensing surface of the image sensor 2, then the projected image represented by the extraordinary rays $A_2$ is focused at the point which is on the side of the lens 1 by the distance $\Delta L$, namely, "front-focused by $\Delta L$". Further, the path length of an extraordinary ray $A_2$ to the photosensing surface of the image sensor 2 is always longer then the path length of an ordinary ray $A_1$, thus, the focal point of the extraordinary rays $A_2$ is always on the side of the lens with respect to the focal point of the ordinary rays $A_1$.

Figure 7:
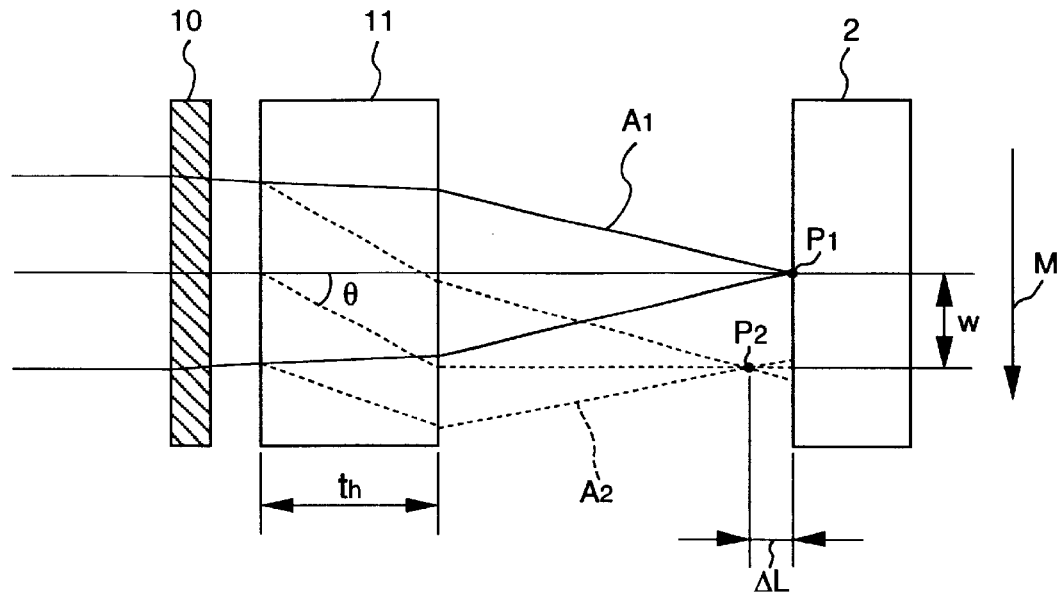
FIG. 7 is a first example of image formation states (image formation example 1) according to the first embodiment.
Figure 9:
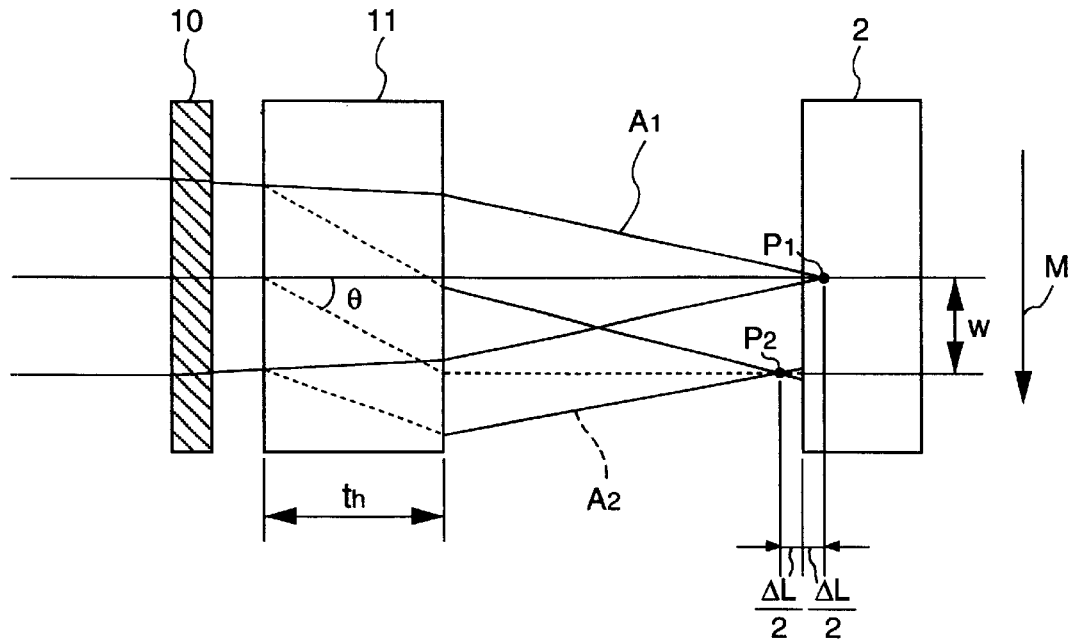
FIG. 9 is a second example of image formation states (image formation example 2) according to the first embodiment.
Figure 11:
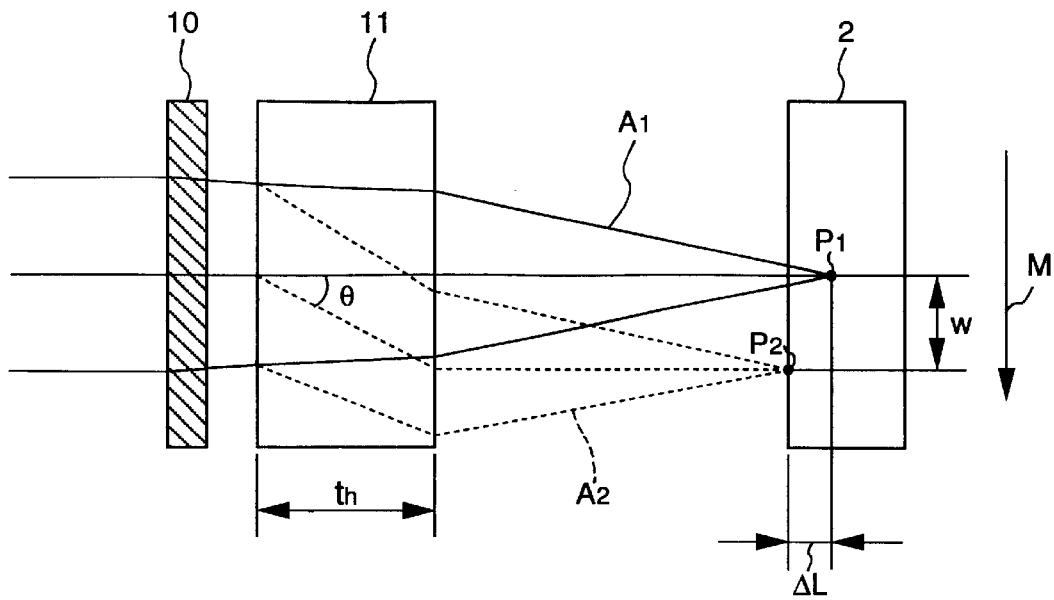
FIG. 11 is a third example of image formation states (image formation example 3)
Figure 13:
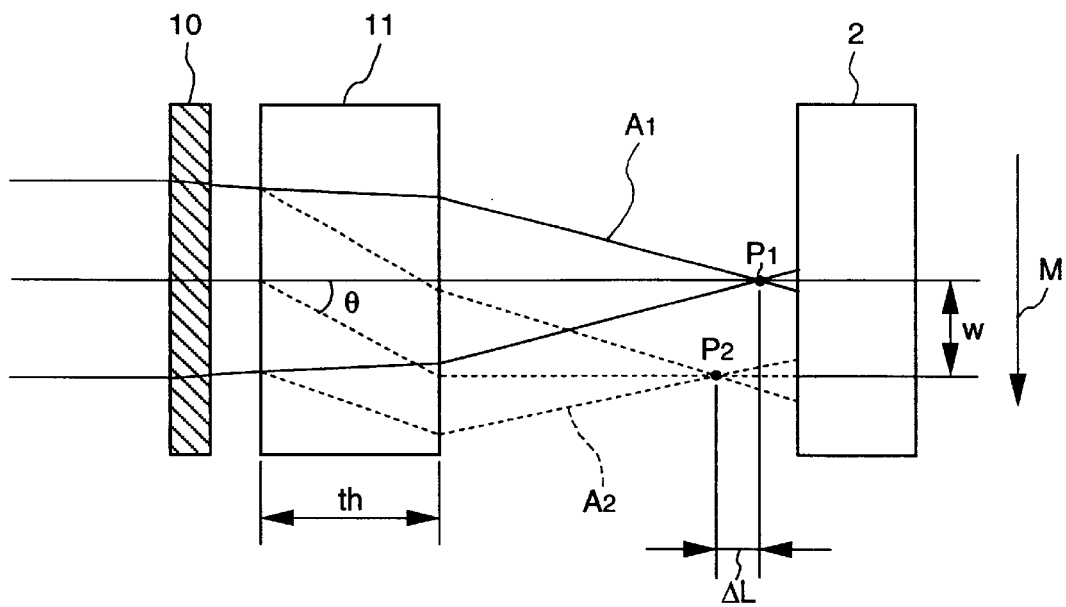
FIG. 13 is a fourth example of image formation states (image formation example 4)
Figure 14:
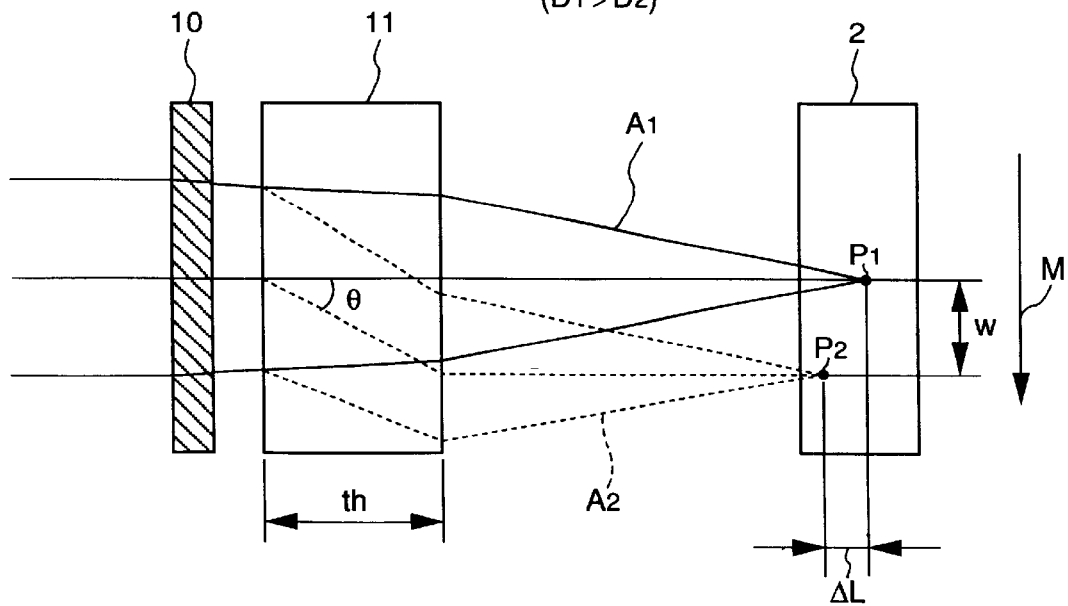
FIG. 14 is a fifth example of image formation states (image formation example 5)

FIGS. 7, 9, 11, 13 and 14 are explanatory views showing that focal points of the ordinary rays $A_1$ and the extraordinary rays $A_2$ change in accordance with focus adjusting control by the image sensing apparatus of the first embodiment. More specifically, FIG. 7 illustrates a case where the ordinary rays $A_1$ are focused at the photosensing surface of the image sensor 2 (i.e., in the focused state), whereas the extraordinary rays $A_2$ are focused before reaching the photosensing surface of the image sensor 2 (i.e., in the "front-focused" state); FIG. 9 illustrates a case where the ordinary rays $A_1$ are focused beyond the photosensing surface of the image sensor 2 (i.e., in the "rear-focused" state), whereas the extraordinary rays $A_2$ are in the "front-focused" state; FIG. 11 illustrates a case where the ordinary rays $A_1$ are in the "rear-focused" state whereas the extraordinary rays $A_2$ are in the focused state; FIG. 13 illustrates a case where both the ordinary rays $A_1$ and the extraordinary rays $A_2$ are in the "front-focused" state; and FIG. 14 illustrates a case where both the ordinary rays $A_1$ and the extraordinary rays $A_2$ are in the "rear-focused" state.

Thus, FIGS. 7, 9, 11, 13 and 14 shows examples of combinations of respective image formation states of ordinary rays and extraordinary rays. As will be described later in detail, the digital filters 12 and 13 are designed to detect frequencies of signals included in image signals by using the fact that frequency components included in the image signals differ depending upon the image formation states of the two groups of refracted rays. Further, respective pairs of the BPF 14 and the detector 16, and the BPF 15 and the detector 17 are set to selectively detects the frequency components. Therefore, the combination of the signals $D_1$ and $D_2$ outputted from the detectors 16 and 17 specifically represent the image formation states of the two groups of refracted rays. The microcomputer 7 determines the image formation states from the input signals $D_1$ and $D_2$, then controls the motor 9 via the motor driver 8. In the first embodiment, the microcomputer 7 controls the motor 9 on the basis of the difference between the signals $D_1$ and $D_2$, namely $D_2-D_1$, (refer to FIGS. 18 and 19).

Figure 8:
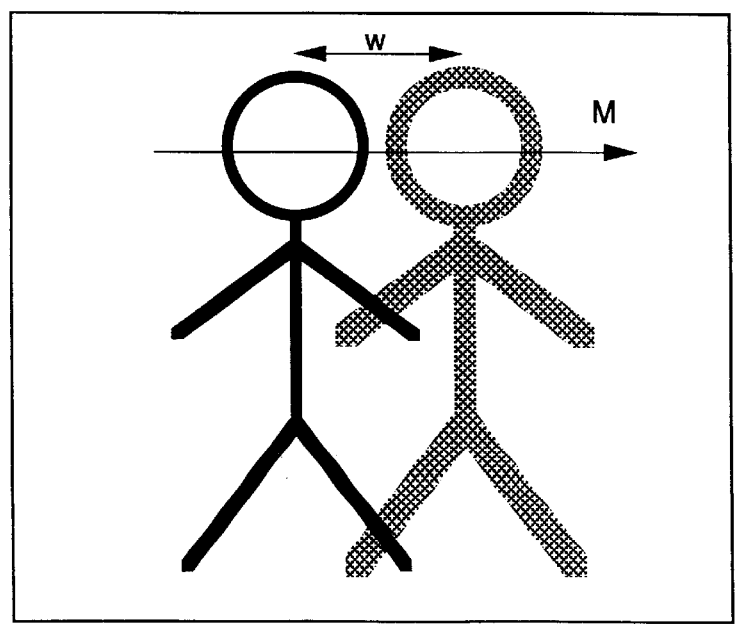
FIG. 8 is a projected image corresponding to the image formation example 1 shown in FIG. 7.
Figure 10:
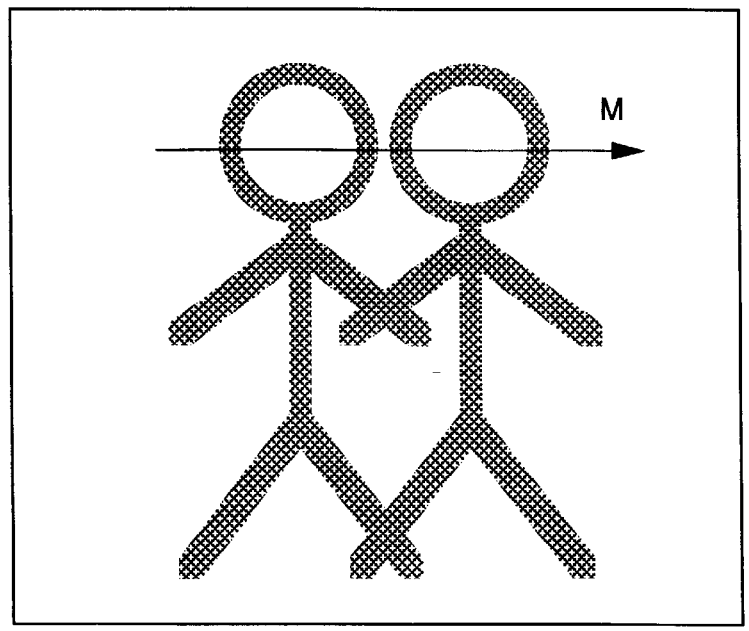
FIG. 10 is a projected image corresponding to the image formation example 2 shown in FIG. 9.
Figure 12:
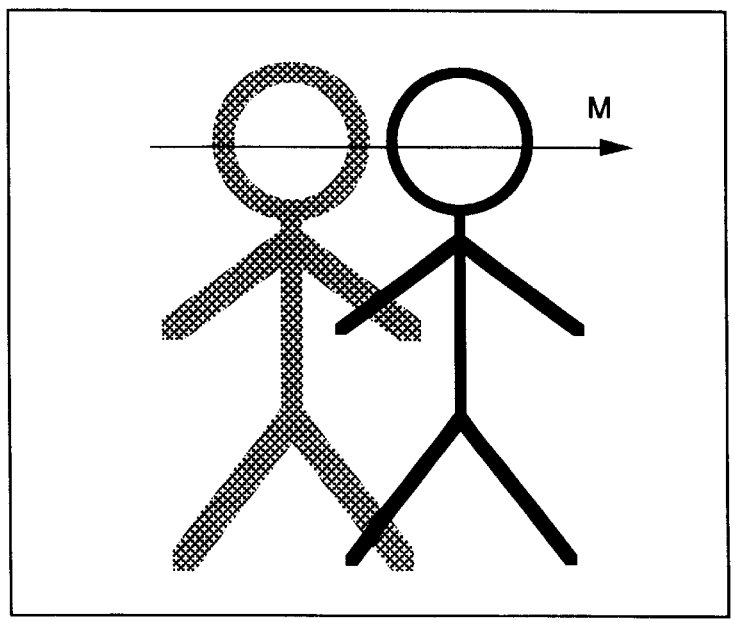
FIG. 12 is a projected image corresponding to the image formation example 3 shown in FIG. 11.

FIGS. 8, 10 and 12 illustrate examples how a composite image of an object is projected on the image sensor 2 when the image forming states are as shown in FIGS. 7, 9 and 11, respectively. In FIGS. 7 to 14, an arrow M shows the main direction of scanning pixels of the image sensor 2. Further, denoting the quantity of light of an image projected by ordinary rays $A_1$ by F1, and the quantity of light of an image projected by rays $A_2$ by $F_2$, $F_1 > F_2$ is assumed.

When the image formation states of the two refracted rays $A_1$ and $A_2$ are as shown in FIG. 7, a composite image projected on the photosensing surface of the image sensor 2 looks as two same images overlaid which are shifted in the main scanning direction by the distance w from each other, as shown in FIG. 8. Further, the left image in FIG. 8 is formed in the focused state, whereas the right image is formed in the "front-focused" state by $\Delta L$. Furthermore, the left image is brighter than the right image as many times as the inverse of an extinction ratio k (<1), namely $F_1/F_2$.

<Filter> . . . First Embodiment

Consider image signals obtained by scanning the image shown in FIG. 8 in the direction of the arrow M (i.e., outputs from the preamplifier 3) at time t. Referring to FIG. 8, when the outputs from the preamplifier 3 at the time t is denoted by $f_0(t)$, then this $f_0(t)$ represents a composite signal of an image signal based on the ordinary rays $A_1$ and an image signal based on the extraordinary rays $A_2$ corresponding to an image signal based on the ordinary rays $A_1$, which has been scanned at a time period $\Delta t$ ($\Delta t$ is a time period required to scan the distance w on the image sensor 2) before the time t. Therefore, when an image signal, based only on the ordinary rays $A_1$, which is in the focused state at the time t (does not include any image signal based on the extraordinary rays $A_2$) is denoted by $h_0(t)$, then the image signal scanned the time period at before the time t can be expressed by $h_0(t-\Delta t)$. In the example illustrated in FIGS. 7 and 8, the extraordinary rays $A_2$ are "front-focused" by the distance $\Delta L$ with respect to the focal point of the ordinary rays $A_1$. The front-focused state of the extraordinary rays $A_2$ is detected as attenuation of high frequency components in the image signals on the image sensor 2. Denoting transfer function based on the attenuation by a function g, and considering an image signal based on the extraordinary rays $A_2$ at the time t is the image signal based on the ordinary rays $A_1$ at the time $t-\Delta t$ with its high frequency components attenuated, then the signal value can be expressed as $g\{h_0(t-\Delta t)\}$. Therefore, the contribution of the extraordinary rays $A_2$ at the time t is $k \cdot g\{h_0(t-\Delta t)\}$.

Accordingly, the image signal output $f_0(t)$ at the time t when the image is scanned in the direction of the arrow M is, $$f_0(t)=h_0(t)+k \cdot g\{h_0(t-\Delta t)\} \qquad (4)$$

Figure 2:
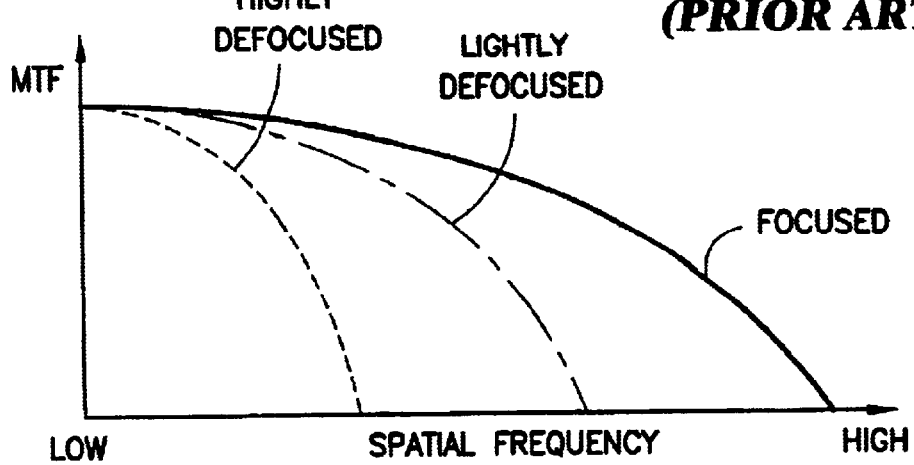
FIG. 2 is a graph showing a general characteristics of spatial frequency of light projected by a lens.
Figure 3:
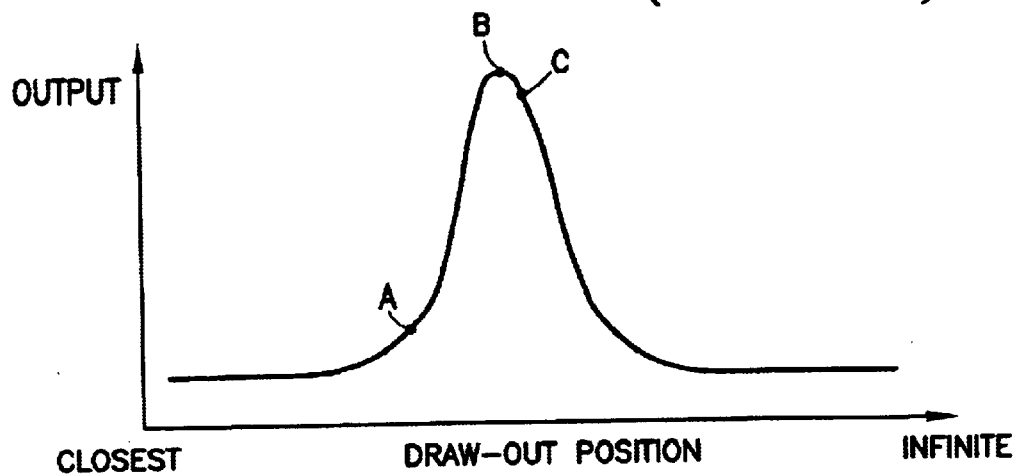
FIG. 3 is a graph showing characteristics of output from a conventional detector.

In the right-hand side of the equation (4), the function $h_0(t)$ represents an image signal of the projected image in the focused state on the basis of the ordinary rays $A_1$ (does not include any image signal based on the extraordinary rays $A_2$), and the function $g\{h_0(t-\Delta t)$ represents an image signal with high frequency components attenuated, where the rate of the attenuation depends upon the changes of MTF curves, as shown in FIG. 2, in the "front-focused" state by $\Delta L$. Therefore, the function $k \cdot g\{h_0(t-\Delta t)\}$ represents an image signal of the projected image based only on the extraordinary rays $A_2$.

It can be seen from equation (4) that the image signal $h_0(t)$ which is based only on the ordinary rays $A_1$ can be obtained by subtracting the term $k \cdot g\{h_0(t-\Delta t)\}$ from the signal $f_0(t)$ outputted from the preamplifier 3. The function represented by the equation (4) is assigned to the filter 12 in the first embodiment, and filter 12 is connected to the signal processing circuit 4 so that the output from the filter 12 enters the signal processing circuit 4. The microcomputer 7 perform processing such that signals based on the ordinary rays $A_1$ outputted from the filter 12 are to be in the focused state, thereby the image signals sent from the filter 12 to the signal processing circuit 4 will represent the focused image based on the ordinary rays $A_1$.

Now a configuration of a filter circuit realizing the function represented by the equation (4) will be discussed.

The transfer function g in the equation (4), showing that the focal point is shifted forward by $\Delta L$, is for applying a process in consideration with the changes represented by the MTF curves as shown in FIG. 2, and the process can be considered that it is realized by an optical low-pass filter (LPF). Therefore, an electronic LPF circuit equivalent to the term, $g\{h_0(t-\Delta t)\}$ is provided. If the electric filter equivalent to the term $g \cdot h_0(t-\Delta t))$ is a LPF, for convenience, then the operation represented by the equation (4) can be achieved by equipping the LPF in a recursive filter shown in FIG. 15.

Figure 15:
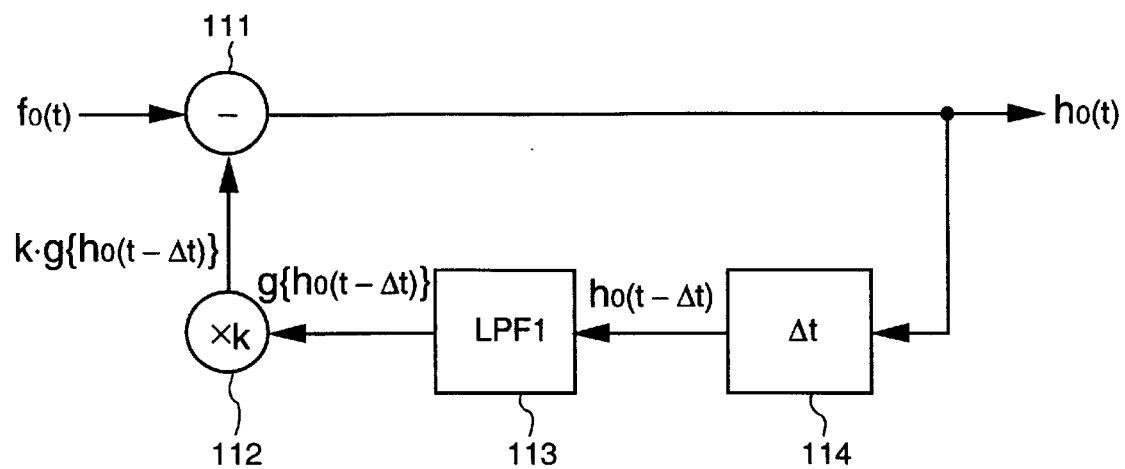
FIG. 15 is a block diagram illustrating a configuration of a recursive filter 12 for taking an image signal $h_0(t)$.

In FIG. 15, reference numeral 111 denotes a subtractor; 112, a multiplier; 113, the aforesaid LPF; and 114, a delay circuit for delaying an input signal by $\Delta t$. Since the value at depends upon the distances between the two split images represented by the ordinary rays $A_1$ and by the extraordinary rays $A_2$, it can be determined depending upon a physical characteristic of the birefringent plate 11.

Assuming that the output from the subtractor 111 is the signal $h_0(t)$ of the image projected by the ordinary rays $A_1$, the output from the delay circuit 114 is an image signal outputted $\Delta t$ before, namely, $h_0(t-\Delta t)$. High-frequency components of the output from the delay circuit 114 is reduced by the LPF 113, thereby a signal which can be represented by $g\{h_0(t-\Delta t)\}$ is obtained. The signal $g\{h_0(t-\Delta t)\}$ is further multiplied by k (k<1) by the multiplier 112, thereby becomes $k \cdot g\{h_0(t-\Delta t)\}$. Therefore, $k \cdot g\{h_0(t-\Delta t)\}$ represents an image signal of a projected image only by the extraordinary rays $A_2$. This value is inputted into the subtractor 111, and the subtractor 111 subtracts $k \cdot g\{h_0(t-\Delta t)\}$ from the original signal $f_0(t)$ at the time t. As a result, the signal based on the extraordinary rays $A_2$ at time t, included in the signal $f_0(t)$ at time t, can be canceled. Consequently, the image signal $h_0(t)$ of the image projected only by the ordinary rays $A_1$ can be obtained as an output from the filter 11.

As described above, the filter circuit 12 shown in FIG. 15 extracts an image signal of an image projected only by the ordinary rays $A_1$ from a composite image signal consisting of an image signal based on the ordinary rays $A_1$ and an image signal based on the extraordinary rays $A_2$. In short, as shown in FIG. 4, the output from the filter 12 is used as an image signal in the first embodiment. The output from the filter circuit 12 enters the processing circuit where the signal is converted into a standardized image signal, such as NTSC, and outputted.

Next, a configuration and operation of the digital filter 13 will be explained. The digital filter 13 detects, when the light paths of two sets of refracted rays (i.e., the ordinary rays and the extraordinary rays) are as shown in FIG. 9, whether the image formation states of the images projected by the ordinary rays and the extraordinary rays are in the "front-focused" state or in the "rear-focused" image.

In an example shown in FIG. 9, an image of an object which is passed through the lens 1 is split into two images by the birefringent plate 11, and the image projected by the ordinary rays $A_1$ is focused at a point $P_1$ which is beyond the photosensing surface of the image sensor 2 by $\Delta L/2$ on an optical axis of the image sensor 2, while the image projected by the extraordinary rays $A_2$ are focused at a point $P_2$ which is in front of the photosensing surface of the image sensor 2 by $\Delta L/2$ on an axis of the image sensor 2. In this case, the composite image projected on the photosensing surface of the image sensor 2 consists of two superposed images shifted by the distance w from each other, as shown in FIG. 10, where the left image (projected by the ordinary rays) is "rear-focused" by $\Delta L/2$ and the right image (projected by the extraordinary rays) is "front-focused" by $\Delta L/2$. Further, the left image is brighter than the right image by the ratio of $F_1/F_2$. In the example as shown in FIG. 9, both the rear-focused image projected by the ordinary rays and the front-focused image projected by the extraordinary rays are defocused by the distance $\Delta L/2$. Accordingly, blurriness of the two images is the same, whereas brightness of the two images differs.

An image signal output when these two superposed images are scanned in the direction of the arrow M is denoted by a function $f_1(t)$. Then, $f_1(t)$ can be expressed by, $$f_1(t)=h_1(t)+k \cdot g\{h_1(t-\Delta t)\} \qquad (5)$$

as in the case of the filter 12. Here, the term $h_1(t)$ represents an image signal of an image projected only by the ordinary rays $A_1$ which is in the "rear-focused" state by $\Delta L/2$. Further, the term $k \cdot h_1(t-\Delta t)$ represents an image signal of an image projected only by the extraordinary rays $A_2$ which is in the "front-focused" state by $\Delta L/2$.

Figure 16:
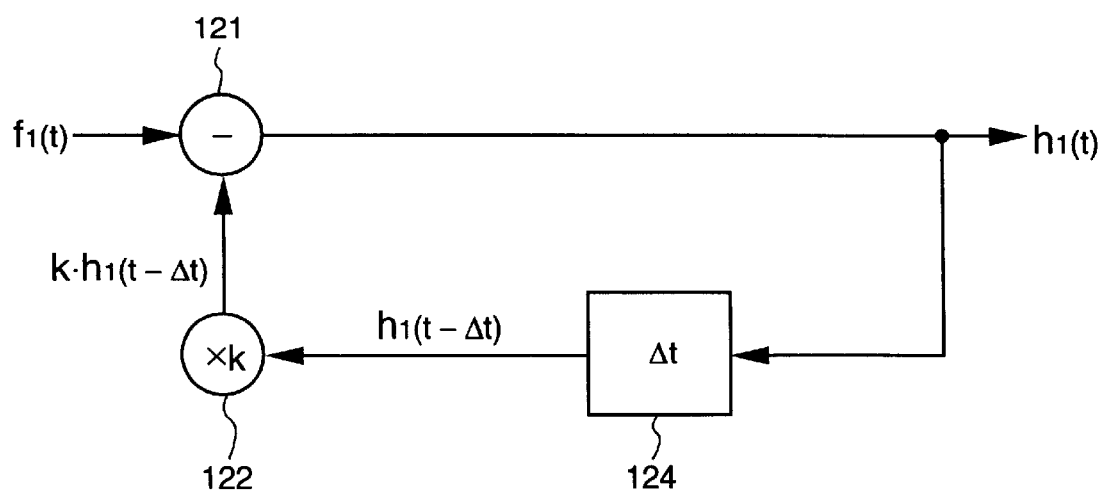
FIG. 16 is a block diagram illustrating a configuration of a recursive filter 13 for taking an image signal $h_1(t)$.

FIG. 16 illustrates a configuration of the filter 13. In FIG. 16, reference numeral 121 denotes a subtractor; 122, a multiplier; and 124, a delay circuit for delaying an input signal for Δt.

Assuming that the output from the subtractor 121 is the image signal $h_1(t)$ which is of the image projected by the ordinary rays $A_1$, then the output from the delay circuit 124 is the delayed signal which is outputted from the subtractor 121 Δt before, namely, $h_1(t-\Delta t)$. $h_1(t-\Delta t)$ is multiplied by k (k<1) in the multiplier 123, thereby $k \cdot h_1(t-\Delta t)$ becomes to represent the image signal of the image projected only by the extraordinary rays $A_2$.

With the recursive filter shown in FIG. 16, the image signal $k \cdot h_1(t-\Delta t)$ of the image projected only by the extraordinary rays $A_2$ can be canceled by using the image signal $h_1(t)$ of the image projected only by the ordinary rays $A_1$. Accordingly, the image signal $h_1(t)$ based on the ordinary rays $A_1$ can be extracted from the original image signal output $f_1(t)$.

Since the filter 13 is designed under the assumption that the ordinary ray and the extraordinary rays have the same de-focused amount, the LPF which is required in the filter 12 is not needed. In other words, when the input image signal is in the different image formation state from that shown in FIGS. 9 and 10, the output from the filter 13 gives a different value h from what is expressed in the equation (5).

For example, when the input image signal is in the image formation state as shown in FIG. 7 (i.e., an image projected by the ordinary rays is in the focused state while an image projected by the extraordinary rays is in front-focused state), then the output from the filter 13, $h_0'(t)$ is expressed by, $$h'_0(t) = f_0(t) - k \cdot h'_0(t - \Delta t) \quad (6)$$
$$= h_0(t) + k \cdot g\{h_0(t - \Delta t)\} - k \cdot h'_0(t - \Delta t)$$
$$= h_0(t) + k \cdot [g\{h_0(t - \Delta t)\} - h'_0(t - \Delta t)]$$

Where k<<1 is assumed, $$h_0(t-\Delta t) \approx h'_0(t-\Delta t) \quad (7)$$

can be estimated. Since the second term $[g\{h_0(t-\Delta t)\}-h'_0(t-\Delta t)]$ of the equation (6) is obtained by subtracting the image signal of the image in the focused state $h'_0(t-\Delta t)$ from the image signal of an image defocused by ΔL, $g\{h_0(t-\Delta t)\}$, it represents high-frequency component included in the image signal of an image in the focused state. Therefore, in the image forming state as shown in FIG. 7, the output from the filter 13 contains more high-frequency components than the output from the filter 12.

Figure 17:
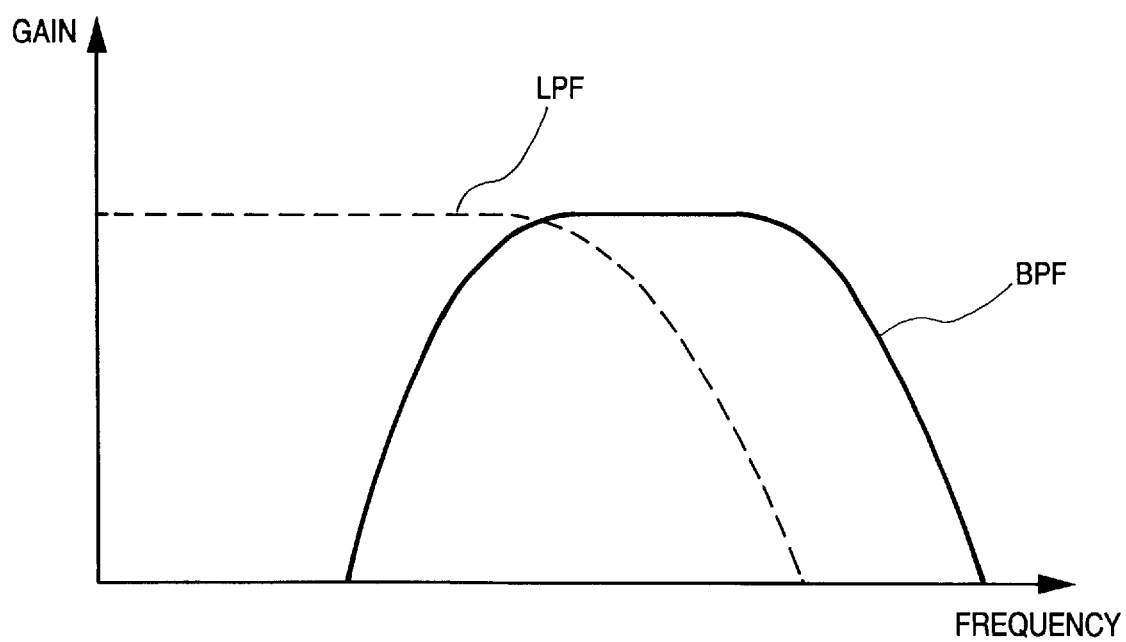
FIG. 17 is a graph showing a frequency band of a signal which BPFs 14 and 15 transmit.

The set frequency bands of the BPFs 14, 15 and LPFs 113 are as shown in FIG. 17, and both pass high-frequency components. The detectors 16 and 17 detect power of the high-frequency components which are outputted from the BPFs 14 and 15, then obtain the outputs $D_1$ and $D_2$, respectively.

Therefore, when the projected images are in the image formation states as shown in FIG. 7, i.e., when the image projected by the ordinary rays is focused while the image projected by the extraordinary rays is front-focused, the greater amount of high-frequency components are included in the signal outputted from the filter 13 than the signal outputted from the filter 12. Therefore, relationship between the outputs from the detectors 16 and 17 is $D_1 < D_2$.

The aforesaid relationship representing that the power of the high-frequency component included in the output from the filter 13 is larger than the power of the high-frequency component included in the output from the filter 12 holds in a case shown in FIG. 13 where an image projected by the ordinary rays Δl is in front-focused state while an image projected by the extraordinary rays $A_2$ is also in front-focused state. In short, in a case of the image formation states as shown in FIG. 13, $D_1 < D_2$ holds, as in the case of the image formation states as shown in FIG. 7.

Next, the outputs from the BPFs 14 and 15 when two images are in image formation states as shown in FIG. 9 will be discussed. The output from the filter 13 is expressed by the $h_1(t)$ as described above, whereas, the output $h_1'(t)$ from the filter 12 is, $$h'_1(t) = f_1(t) - k \cdot g\{h'_0(t - \Delta t)\} \quad (8)$$
$$= h_1(t) + k \cdot h_1(t - \Delta t) - k \cdot g\{h'_1(t - \Delta t)\}$$
$$= h_1(t) + k \cdot [h_1(t - \Delta t) - g\{h'_1(t - \Delta t)\}]$$

Here, if k<<1 holds, $$h_1(t-\Delta t) \approx h'_1(t-\Delta t) \quad (9)$$

Since the second term $[h_1(t-\Delta t)-g\{h'_1(t-\Delta t)\}]$ in the right hand side of the equation (8) is obtained by subtracting the image signal corresponding to an image obtained by defocusing a Δl/2-defocused image by Δl, $g\{h'_1(t-\Delta t)\}$, from the image signal of an image defocused by ΔL/2, $h_1(t-\Delta t)$, it represents high-frequency components only included in an image signal of an image defocused by ΔL/2. Therefore, in the image formation example as shown in FIG. 9, the output from the filter 13 contains more high-frequency components than the output from the filter 12. Thus, the relationship between the output $D_1$ from the detector 16 and the output $D_2$ from the detector 17 is $D_1 < D_2$.

Next, the outputs from the detectors 16 and 17 when the images projected by the ordinary rays and extraordinary rays are in the states as shown in FIG. 11 will be discussed. The states shown in FIG. 11 illustrate an image of an object passed through the lens 1 is split into two images by the birefringent plate 11, and the image projected by the extraordinary rays $A_2$ is focused on the photosensing surface of the image sensor 2, whereas the image projected by the ordinary rays $A_1$ is focused at a point $P_1$ which is beyond the photosensing surface of the image sensor 2 by ΔL on the optical axis. In such case, the image projected on the photosensing surface of the image sensor 2 is two superposed images shifted by the distance w from each other, where the right image is focused, whereas the left image is rear-focused by ΔL, further the left image is brighter than the right image by the ratio of $F_1/F_2$. An image signal output when the above composite image is scanned in the direction of the arrow M is denoted by $f_2(t)$, then, $$f_2(t) = g\{h_0(t)\} + k \cdot h_0(t-\Delta t) \quad (10)$$

At this time, the output $h_2'(t)$ from the filter 13 is, $$h'_2(t) = f_2(t) - k \cdot h'_2(t - \Delta t) \quad (11)$$
$$= g\{h_0(t)\} + k \cdot h_0(t - \Delta t) - k \cdot h'_2(t - \Delta t)$$
$$= g\{h_0(t)\} + k \cdot [h_0(t - \Delta t) - h'_2(t - \Delta t)]$$

Here, k<<1, so, $$h'_2(t-\Delta t) \approx g\{h_0(t-\Delta t)\} \quad (12)$$

Note, the terms inside of the square brackets [ ] in the equation 11 represents a signal obtained by subtracting an image signal of an image defocused by ΔL from an image signal of a focused image, i.e., high-frequency components included in the image signal of a focused image. Whereas, the output $h_2(t)$ from the filter 12 is expressed by, $$h_2(t) = f_2(t) - k \cdot g\{h_2(t - \Delta t)\} \quad (13)$$
$$= g\{h_0(t)\} + k \cdot h_0(t - \Delta t) - k \cdot g\{h_2(t - \Delta t)\}$$
$$= g\{h_0(t)\} + k \cdot [h_0(t - \Delta t) - h_2(t - \Delta t)]$$

Here, k<<1, thus, $$h_2(t-\Delta t)g\{h_0(t-\Delta t)\} \quad (14)$$

The term inside of the square brackets [ ] in FIG. 13 corresponds to a signal obtained by subtracting an image signal of an image defocused by Δ2L from the image signal of a focused image. Therefore, the equation inside of the square brackets [ ] represents larger high-frequency components included in the image signal of the focused image. Therefore, when the two images are in the image formation states as shown in FIG. 11, the output from the filter 12 contains larger high-frequency components than the output from the filter 13. Accordingly, in the image formation states as shown in FIG. 11, relationship between the outputs from the detectors 16 and 17 is $D_1 > D_2$.

It should be noted that a case where the output from the filter 12 contains more high-frequency components than the output from the filter 13 is not limited to that shown in FIG. 11. The image formation states as shown in FIG. 14, i.e., a case where an image projected by the extraordinary rays is rear-focused and an image projected by the ordinary rays is also rear-focused by ΔL plus the defocused amount of the image projected by the extraordinary rays, produces the same result. In short, in the case as shown in FIG. 14, the relationship between outputs from the detectors is also $D_1 > D_2$.

<Object Image Point Control> . . . First Embodiment

Figure 18:
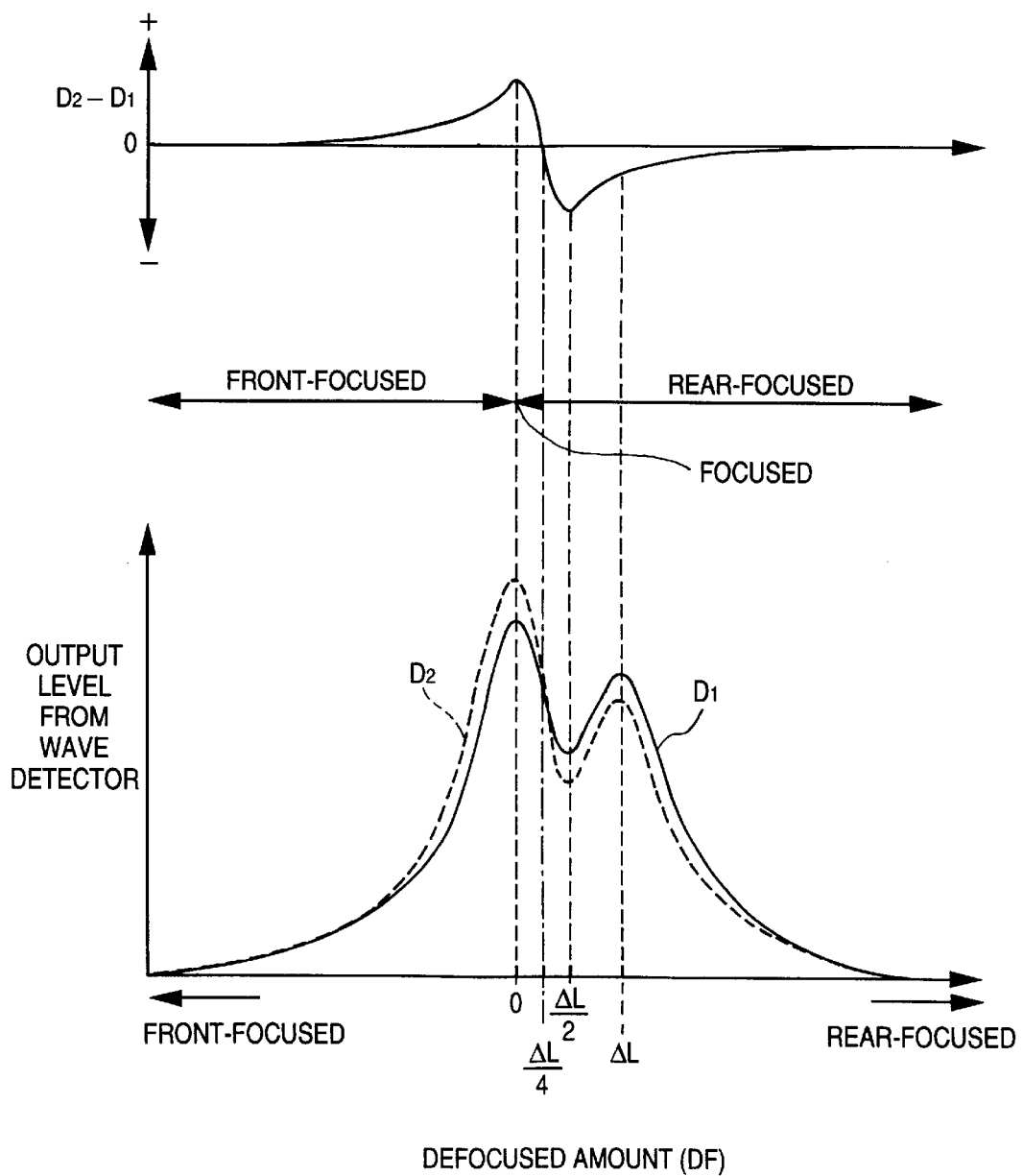
FIG. 18 is a graph showing a relationship between a defocused amount DF of an ordinary ray and output levels ($D_1$, $D_2$) from detectors according to the first embodiment.

FIG. 18 shows graphs depicting the changes in output levels of $D_1$ and $D_2$ and the difference between them, $D_2 - D_1$, with respect to the defocused amount DF, when the defocused amount DF between an object image point to which the ordinary rays $A_1$ converge and the photosensing surface of the image sensor 2 is variously altered (including image formation states shown in FIGS. 7 to 14 described above).

Regarding the defocused amount DF from the photosensing surface of the image sensor 2 to the object image point to which the ordinary rays $A_1$ converge the direction from the lens toward the image sensor 2 is defined as the positive direction. Then, when the object image point to which the ordinary rays $A_1$ converge is at a rear-focused position by about ΔL/4, i.e., in rear-focused state by DF=ΔL/4, then $D_2 - D_1 = 0$ (i.e., $D_2 = D_1$). Further, in rear-focused state by 0<DF<ΔL/4 or in front-focused state by DF<0, then $D_2 - D_1 > 0$ (i.e., $D_2 > D_1$). Whereas, in rear-focused state by DF >ΔL/4, then $D_2 - D_1 < 0$ (i.e., $D_2 < D_1$).

As a whole, the following determinations become possible.

If $D_2 - D_1 < 0$, then an optical system is always in the "rear-focused" state.

If $D_2 - D_1 > 0$, then an optical system is in the "front-focused" state in most cases.

The reason of "in most cases" in the case of $D_2 - D_1 > 0$ is that, when 0<DF<ΔL/4, the optical system is actually in the "rear-focused" state in spite of the condition $D_2 - D_1 > 0$. However, although the image formation state in the range of 0<DF<L/4 is the "rear-focused" state, strictly speaking, since ΔL<<1, there is no inconvenience to consider it as the focused state substantially.

Figure 19:
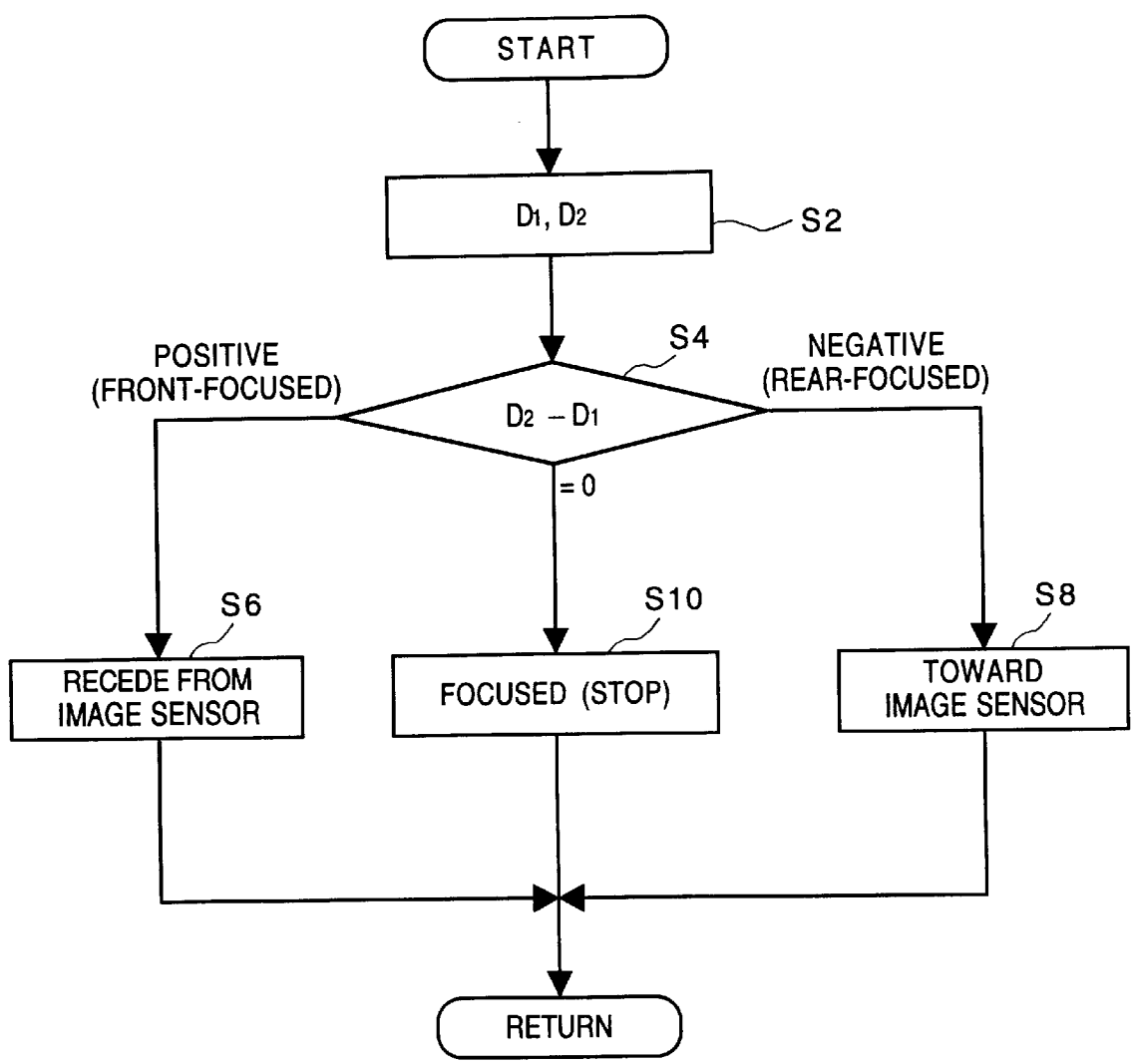
FIG. 19 is a flowchart showing a control operation according to the first embodiment.

FIG. 19 is a flowchart showing an operational sequence of the microcomputer 7.

The microcomputer 7 performs A/D conversion on the outputs $D_1$ and $D_2$ from the detectors 15 and 16 by an A/D converter (not shown) equipped inside, then uses the converted signals (step S2) for determination as the following.

$D_2 - D_1 < 0 \rightarrow$ "rear-focused" state
$D_2 - D_1 > 0 \rightarrow$ "front-focused" state When it is determined that the image formation state is the "rear-focused" state, then the lens 1 is moved to the direction away from the image sensor 2 by driving the motor 9 through the motor driver δ (step S8). In opposite, when it is determined that the image formation state is the "front-focused" state, then the lens 1 is moved toward the image sensor 2 by also driving the motor 9 through the motor driver 8 (step S6).

The determination of the image formation state is performed in the following manner.

The image formation state in the range 0<DF<ΔL/4 is considered to be substantially the focused state in this embodiment as described above. Here, the diameter of the circle of least confusion corresponding to the ΔL/4 defocused amount has the minimum value and is known. If the diameter of the circle of confusion of the image projected by the ordinary rays $A_1$ is smaller than the diameter of the circle of least confusion, then there is no inconvenience to determine that the image formation state is the focused state. Therefore, when $D_1 = D_2$ is determined at step S4, the process proceeds to step S10, where servo mechanism of the motor is locked to stop moving the lens under consideration that an image projected by the ordinary rays is focused.

<Modification of the First Embodiment>

According to the above embodiment, an image signal of an image projected only by the ordinary rays obtained from the birefringence phenomena is distilled by canceling an image signal of an image projected by the extraordinary rays which is obtained from an image signal of the image projected by the ordinary rays. Then, the distilled image signal is outputted as a standardized NTSC image signal. However, the present invention is not limited to this, and can be vice versa. That is, the polarization direction of the polarizing filter 10 is adjusted to the polarization direction of the extraordinary rays so as to make the quantity of light of the image projected by the extraordinary rays be larger then the quantity of light of the image projected by the ordinary rays. Then, the image signal of the image projected by the ordinary rays is canceled by using the image signal of the image projected by the extraordinary rays. Accordingly, the image signal of the image projected only by the extraordinary rays is extracted, and outputting the obtained image signal as a standardized NTSC image signal.

Accordingly, it is possible to obtain the same effect as that in the first embodiment according to this modification.

<Advantages of the First Embodiment and Its Modification>

As described above, the image sensing apparatus or the focus adjusting apparatus in the first embodiment has following advantages:

I: Two rays (i.e., ordinary rays and extraordinary rays) are derived from light which originated from a single light source by using a birefringent plate. Since a crystal, used as a birefringent plate, having a nature of causing the birefringence phenomena can split light into two without physically moving. As a result, the configurations of the image sensing apparatus and the focus adjusting apparatus according to the above embodiments become simple.

II: In the apparatus according to the embodiments, the two split rays are focused at different positions (apart from each other by the distance w) on the image sensing surface of the image sensor. Further, the direction of the shift from the focusing position of one group of rays to the focusing position of the other group of rays is selected to be parallel to the scanning direction of the image sensor and set so that the image projected by the ordinary rays is scanned prior to the image projected by the extraordinary rays. Then, the image signal obtained with the help of the birefringent plate and the image sensor which are arranged as described above is sent to two recursive filters, where respective filtering processes are performed on the signal. One of the recursive filter (12) has the delay circuit (114) for delaying the image signal for a period ($\Delta t$) corresponding to the time gap which depends upon the distance w, a low-pass filter (113) for extracting high-frequency components which are generated when the projected image is in a defocused state from the delayed image signal, and a gain setting circuit (112). With this configuration, it is possible for the filter 12 to extract the image signal of the image projected only by the ordinary rays. Further, the filter 12 can also extract the high-frequency components generated when the image projected by the ordinary rays is in a defocused state.

III: The other recursive filter 13 has the delay circuit (124) for delaying the image signal for a period ($\Delta t$) corresponding to the time gap which depends upon the distance w and a gain setting circuit (122). Accordingly, the filter 13 can also extract image signals of an image projected only by the ordinary rays. Further, the filter 13 can also extract the high-frequency components generated when the image projected by the ordinary rays is in a defocused state.

Therefore, image signals of an image projected only by the ordinary rays can be obtained from both the outputs from the recursive filters 12 and 13, thus, it functions as an image sensing apparatus.

IV: The aforesaid two filters extracts high frequency components generated when the ordinary rays are defocused and when the extraordinary rays are defocused. Considering the fact that the respective powers of the high frequency components based on the ordinary rays and based on the extraordinary components differ when an projected image is in front-focused state and when in rear-focused state, it is possible to determine whether the projected image of the object is in front-focused state or in rear-focused state by detecting the high frequency components. More specifically, it is possible to determine the direction of lens to be moved for obtaining the focused state, according to the aforesaid embodiments, thus the automatic focusing operation can be performed more quickly and smoothly than the conventional climbing servo method. Further, since wobbling operation becomes unnecessary, it is possible to obtain a high quality image near the focal point. Furthermore, since the wobbling operation is unnecessary, a lens driving system is not required to have fast driving speed, large driving torque, and high driving precision. As a result, a relatively small apparatus can be manufactured at low cost.

V: The birefringent plate 11 generates two rays, namely, ordinary ray and extraordinary ray. The birefringent plate 11 requires a recursive filter in the filters 12, 13. If a non-recursive filter was used in the filters 12 and 13, it would induce a third order ray, a fourth order ray, . . . , and n-th order ray. The non-recursive filter cannot cancel the high-order rays completely.

VI: The filter 13 is designed so that the filter 12 extracts an image signal derived from solely an ordinary ray where the ordinary ray is focused. In order to determine whether it is front-focused or rear-focused, the filters 12 and 13 have to produce comparison signals. For this reason, the filter 12 is provided with a LPF while the filter 13 is not provided with a LPF. See FIGS. 15 and 16. When an image by ordinary ray is front-focused (or rear-focused) with the same defocused amount as an image by extraordinary ray which is rear-focused (or front-focused), one signal derived from the extraordinary ray can be canceled by the other signal derived from the ordinary ray, in the filters 12 and 13.

Accordingly, a substitute circuit can be provided instead of the LPF in the filters 12, 13.

<Second Embodiment>

In the first embodiment as described above, a birefringent plate is used to split light from a single light source into two rays. However, means for obtaining two rays is not limited to the birefringent plate, and can be a mirror, for example. The second embodiment describes a case using a mirror.

Figure 20:
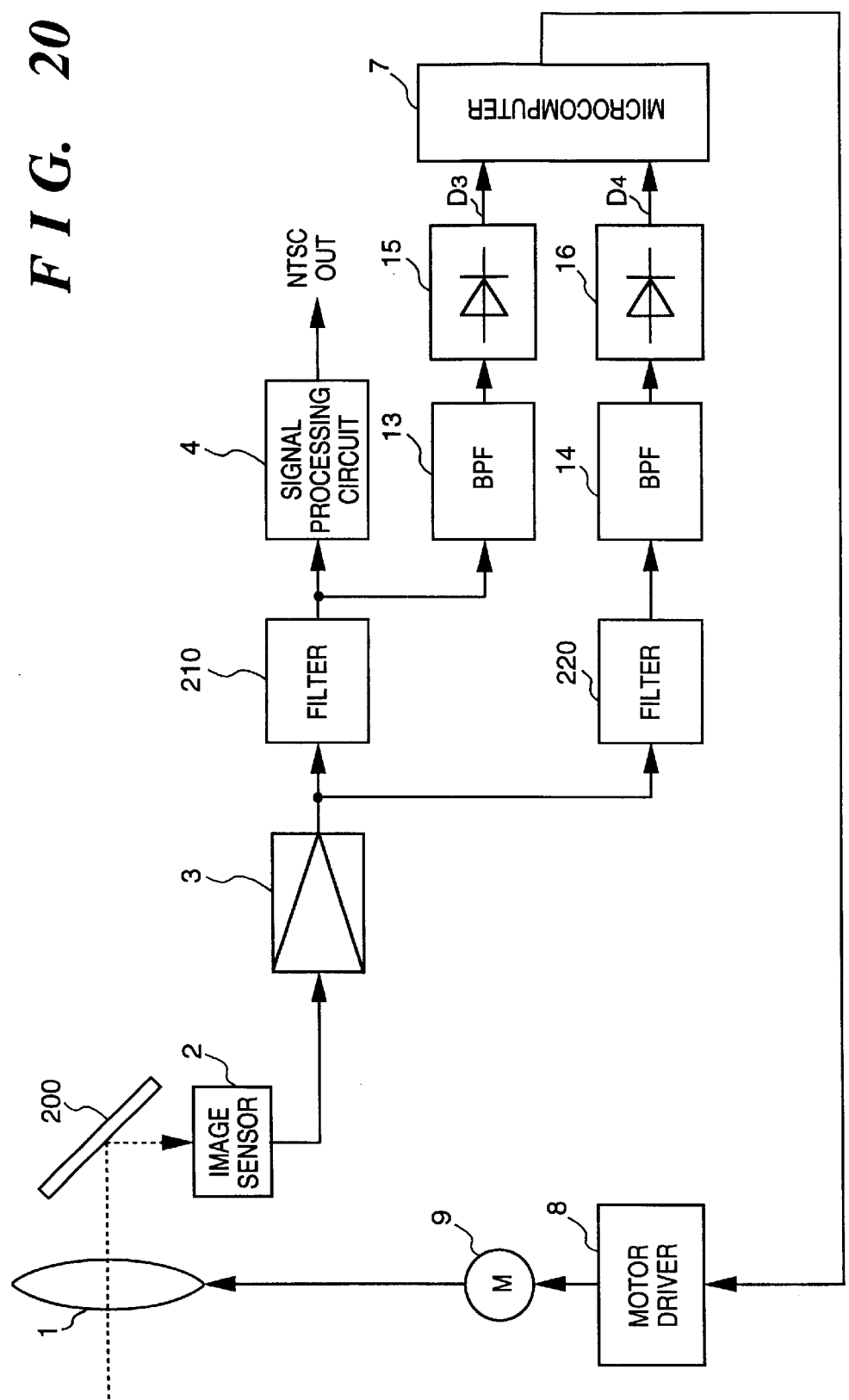
FIG. 20 is a block diagram illustrating a configuration of an image sensing apparatus using a mirror as separating means according to a second embodiment.

FIG. 20 is a block diagram illustrating a configuration of an image sensing apparatus according to the second embodiment. In FIG. 20, the units and elements referred by the same reference numerals as those in FIG. 4 (described in the first embodiment) are the same and operate the same, too, thus explanations of those are omitted. As described above, the image sensing apparatus in the second embodiment has a mirror 200 instead of the birefringent plate which is used in the first embodiment. Filters 210 and 220 used in the second embodiment are non-recursive type, since reflected rays from the mirror 200 are utilized.

The front surface of the mirror 200 is a semi-transparent reflecting surface, and the rear surface of the mirror is a full-reflecting surface. The image sensor 2 senses the projected rays which are reflected by the mirror 200. The filter 210 distills an image signal of an image projected by the primary projected rays by canceling image signals of images projected by the secondary or the higher order of reflected rays from an image signal of a composite image projected by all the rays coming from the mirror 200. The filter 220 distills an image signal of an image projected by the primary rays by canceling image signals, including high-frequency components, of images projected by the secondary or the higher order of reflected rays from an image signal of a composite image projected by all the rays coming from the mirror 200.

<Function of the Mirror> . . . Second Embodiment

When the mirror is set so that the angle made between the mirror 200 and the optical axis of the lens 1 is 45° and the angle made between the image sensor 2 and the mirror 200 is also 45°, an image of the object projected by the lens 1 is reflected by the mirror 200, and forms a plurality of the images overlaid each other on the photosensing surface of the image sensor 2. This process will be described below in detail.

Figure 21:
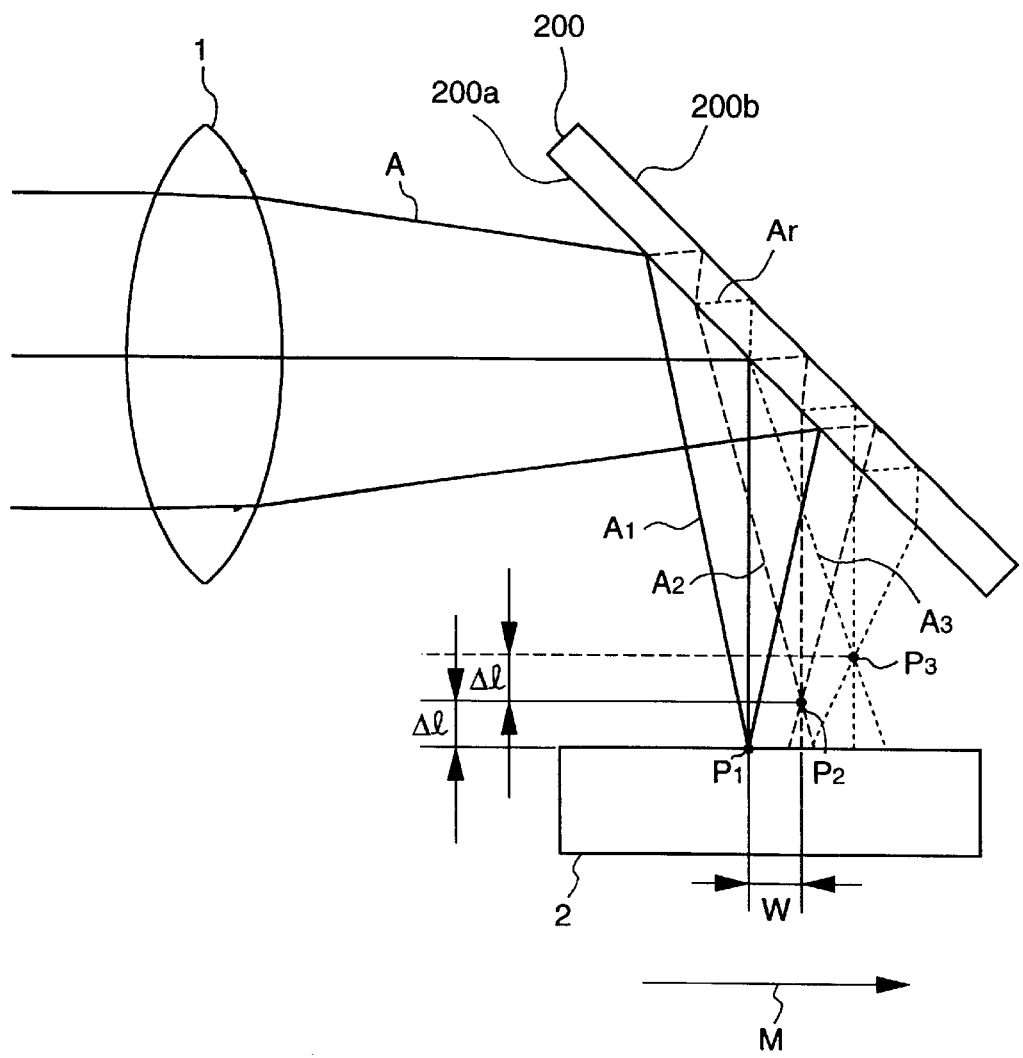
FIG. 21 is an example of image formation states (image formation example 6) by using an optical system according to the second embodiment.

Referring to FIG. 21, solid lines A denote incoming rays, solid lines $A_1$ denote primary reflected rays of the incoming ray A reflected by a front surface (half mirror surface) 200a of the mirror 200 for the first time, dashed lines $A_2$ denote secondary reflected rays of the incoming rays A which passed through the front surface 200a and are reflected by a rear surface (full reflective surface) 200b of the mirror 200, and the doted lines $A_3$ denote the third order of reflected rays of the incoming rays A which passed through the front surface 200a, then reflected by the rear surface 200b, further reflected by the front surface 200a, and again reflected by the rear surface 200b. The higher order of reflected rays than the third order of reflected rays are omitted in FIG. 21.

When the incoming rays A incident on the mirror 200, first, the rays A are split into rays which are reflected by the front surface 200a and rays which are transmitted through the front surface 200a. Denoting the reflection rate of the front surface 200a by $k_R$, transmittance by $k_T$, and the quantity (intensity) of the incoming rays A by F, then the quantity of light, $F_1$, of the primary reflected rays $A_1$ can be expressed as, $$F_1 = k_R \cdot F \quad (15)$$

where, $$k_R + k_T < 1 \quad (16)$$

Further, in this case, the rays passed through the front surface 200a is totally reflected by the rear surface 200b. Thereafter, the rays are again split into rays which are reflected by the front surface 200a and head for the rear surface 200b, and rays which pass through the front surface 200a and head for the image sensor 2 (secondary reflected rays $A_2$). Assuming that the reflection rate of the rear surface 200b is 100%, then the quantity of light, $F_2$, of the secondary reflected rays $A_2$ is expressed as, $$F_2 = k_T^2 \cdot F \quad (17)$$

The rays $A_r$ which are reflected by the front surface 200a are fully reflected again by the rear surface 200b, thereafter, again split into rays which are reflected by the front surface 200a and head for the rear surface 200b and rays which pass through the front surface 200a (third order of reflected rays $A_3$). The quantity of light, $F_3$, of the third order of reflected rays $A_3$ is, $$F_3 = k_T^2 \cdot k_R \cdot F \quad (18)$$

In general, the quantity of light, $F_n$, of the n-th order of reflected rays ($n \geq 4$) can be expressed by, $$F_n = k_T^2 \cdot k_R^{n-2} \cdot F \quad (19)$$

If $k_T = k_R = k$ is assumed in the second embodiment, the equation (19) becomes, $$F_n = k^n \cdot F \quad (20)$$

As shown in FIG. 21, with an increase of the number of times that the rays which have been passed through the lens 1 are reflected by the mirror 200 (namely, the order of the reflected rays) increases, the light path of the rays is lengthened by a fixed length, $\Delta l$, by each reflection. When the index of refraction of glass of the mirror 200 (with respect to air) is $\gamma$, then $\Delta l$ can be expressed as, $$\Delta l = 2n \cdot \frac{2\gamma}{\sqrt{4\gamma^2 - 2}} \quad (21)$$

When the total light path length of the primary reflected rays is denoted by l, and the thickness of the mirror 200 is denoted by th, then the total light path length, $l_n$, of the n-th reflected rays $A_n$ is, $$l_n = l + n \cdot \Delta l \quad (22)$$

Further, by adjusting the horizontal scanning direction of the image sensor 2 to the direction of an arrow M in FIG. 21, the positions of image of an object formed on the photosensing surface of the image sensor 2 shift by a fixed interval $\Delta w$ in the direction of the arrow M, like $P_1 \rightarrow P_2 \rightarrow P_3 \rightarrow \ldots$, and so on, as the rays are reflected by the mirror 200. The interval $\Delta w$ is, $$w = \frac{2 \cdot th}{\sqrt{4\gamma^2 - 2}} \quad (23)$$

Referring to FIG. 21 as described above, n reflected images whose intensities decrease as the order of n increases (based on the equation 20) and whose image points are shifted toward a more front-focused point are projected and superposed on the photosensing surface of the image sensor 2 at positions shifted to the direction of the arrow M (based on the equation 23) as the order of n increases. Further, when the image sensor 2 is scanned in the direction of the arrow M as shown in FIG. 21, if an image signal outputted from the image sensor 2 (i.e., output from the preamplifier 3) is denoted by a function $f_0(t)$, then, $$f_0(t) = h_0(t) + k \cdot g\{h_0(t - \Delta t)\} + \quad (24)$$
$$k^2 \cdot g \circ g\{h_0(t - 2\Delta t)\} +$$
$$k^3 \cdot g \circ g \circ g\{h_0(t - 3\Delta t)\} + \ldots$$

In the equation 24, similarly to the notation of g{ } in the first embodiment, it is a function for deriving an image signal with high frequency components attenuated, where the image signal is changed depending upon the changes of MTF curves, as shown in FIG. 2, in the "front-focused" state by $\Delta l$. Further, $\Delta t$ in the equation 24 is different from that of the first embodiment, and shows the time required to scan the distance w (w in FIG. 21) on the photosensing surface of the image sensor 2. Further, "g∘" denotes a function which maps g(x) by using g(x) again, when a function or a mapped image g(x) is defined. Therefore, $$g \circ g(x) = g\{g(x)\} \quad (25)$$

Furthermore, $h_0(t)$ in the equation 24 shows an image signal of an image projected only by the primary reflected rays $A_1$ when the image projected by the ray $A_1$ is focused. Thus, the second term $k \cdot g\{h_0(t-\Delta t)\}$ in the right-hand side of the equation 24 represents an image signal of an image projected only by the secondary reflected rays $A_2$. Similarly, the third term $k^2 \cdot g \circ g\{h_0(t-2\Delta t)\}$ represents an image projected only by the third order of reflected rays $A_3$; and the forth term $k^3 \cdot g \circ g \circ g\{h_0(t-3\Delta t)\}$, by the fourth order of reflected rays $A_4$. Terms which represent image signals projected by the fifth or higher order of reflected rays, $A_n$, can be expressed similarly as above.

<Filter 220> . . . Second Embodiment

Figure 22:
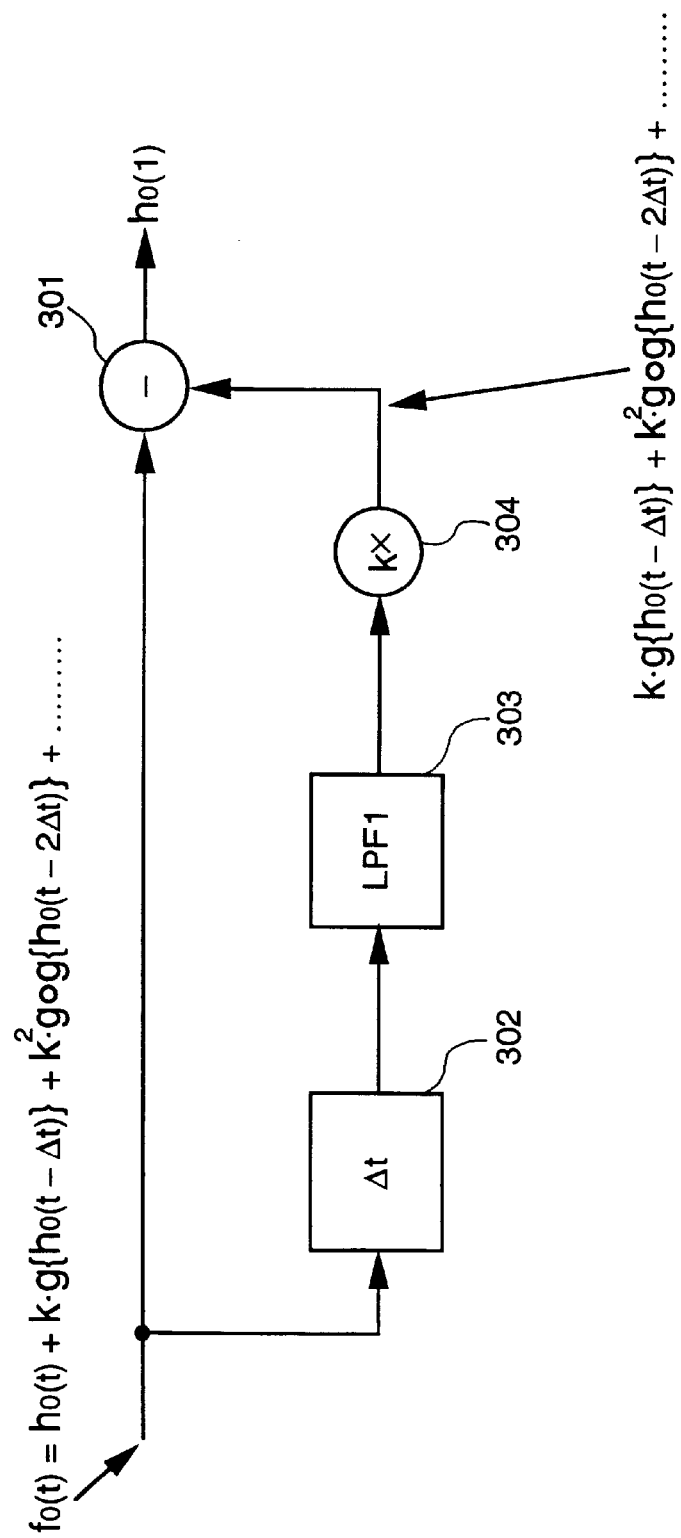
FIG. 22 is a block diagram illustrating a configuration of a filter 210 according to the second embodiment.

A digital filter which has a function of the equation 24 has a configuration as shown in FIG. 22, for instance. In FIG. 22, reference numeral 301 denotes a subtractor; 302, a delay circuit for delaying an image signal for $\Delta t$; 303 a low-pass filter (LPF); and 304, a multiplier (gain=k). Where projecting rays are not focused, the changes of the MTF curves of an image signal can be considered equivalent to an effect by an optical low-pass filter. Similarly to the first embodiment, by configuring an electric LPF corresponding to the aforesaid function g{ } and providing it at a part of a non-recursive filter shown in FIG. 22, it becomes possible to cancel image signals of images projected by the secondary and higher order of reflected rays. More specifically, the non-recursive filter shown in FIG. 22 can extract the image signal $h_0(t)$ of an image projected only by the primary reflected rays $A_1$ out of the original composite image signal $f_0(t)$.

More specifically, the non-recursive filter shown in FIG. 22 is applied to the filter 210 shown in FIG. 20 in the second embodiment. In the circuit shown in FIG. 22, when a signal represented by the aforesaid equation 24 enters the delay circuit 302, it is delayed for Δt and outputted to the LPF 303, where high-frequency components of the signal is reduced. Thereafter, the signal is multiplied by k by the multiplier 304, and the signal expressed as below is outputted from the multiplier 304.

$$k \cdot g\{h_0(t - \Delta t)\} + k^2 \cdot g \circ g\{h_0(t - 2\Delta t)\} + k^3 \cdot g \circ g \circ g\{h_0(t - 3\Delta t)\} + \ldots \quad (26)$$

In other words, a signal equivalent to a total image signal based on the secondary and higher order of reflected rays is outputted from the multiplier 304. When the output signal from the multiplier 304 is subtracted from the original input signal $f_0(t)$ by the subtractor 301 in the filter as shown in FIG. 22, then the image signal $h_0(t)$ of an image projected only by the primary reflected rays is outputted from the subtractor 301.

Thus, the filter 210 according to the second embodiment is configured as a non-recursive filter shown in FIG. 22, and an image signal of an image projected only by the primary reflected rays $A_1$ can be extracted from a superposed image signal of all images projected by all the reflected rays from the mirror 200. The extracted signal is outputted to the signal processing circuit 4. The signal processing circuit 4 converts this signal into a standardized NTSC signal, then outputs it.

<Filter 210> . . . Second Embodiment

As in the first embodiment, each order of reflected rays produce various image formation states in the second embodiment.

Figure 24:
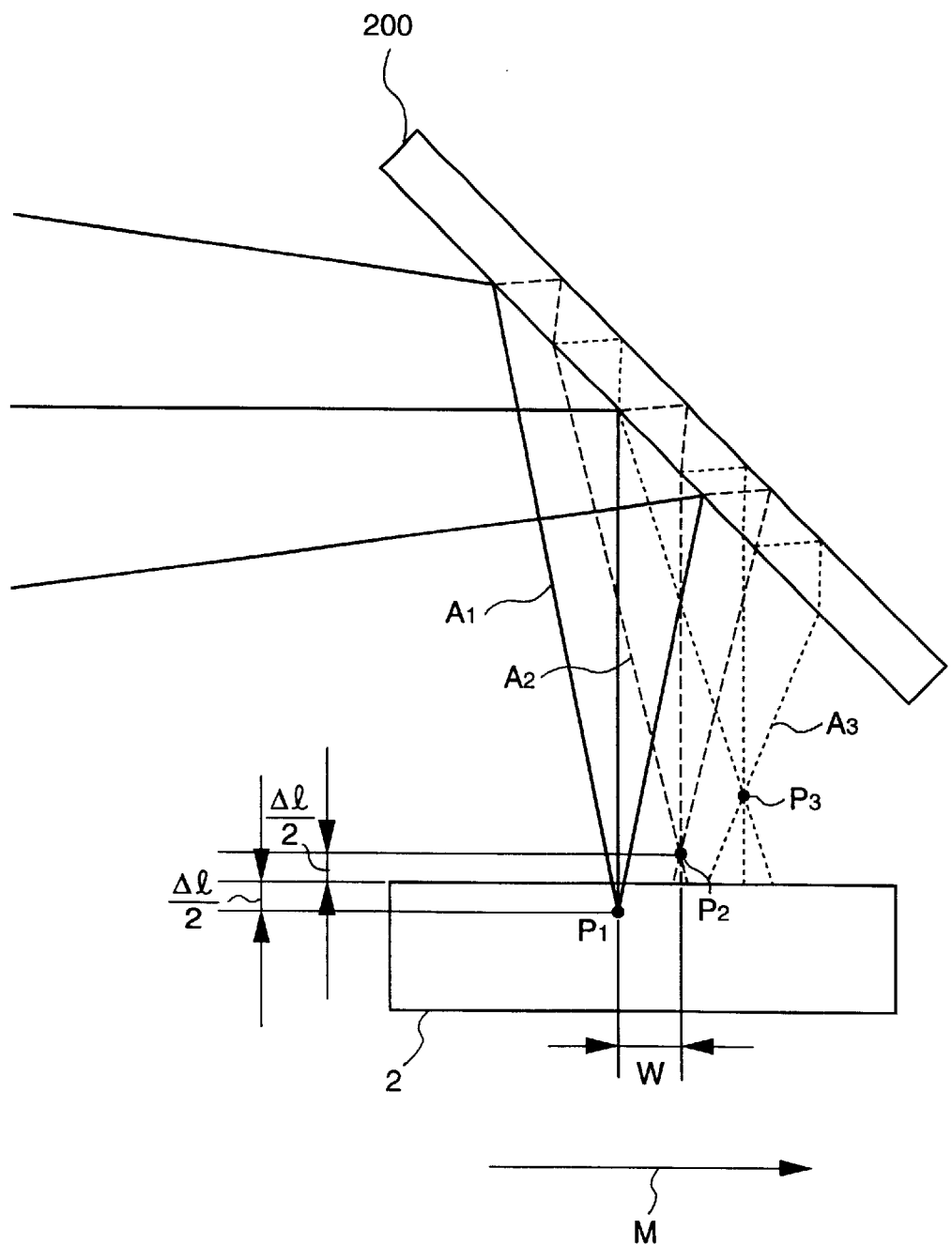
FIGS. 24 to 27 are various examples of image formation states by the optical system according to the second embodiment.

In the image formation states as shown in FIG. 24 (image formation example 6), an image projected only by the primary rays $A_1$ is focused at a point $P_1$ (a point which is apart from the photosensing surface of the image sensor 2 by Δl/2 on the optical axis in the receding direction from the mirror 200), while an image projected by the secondary reflected rays $A_2$ is focused at a point $P_2$ (a point which is apart from the photosensing surface of the image sensor 2 by Δl/2 on the optical axis in the side closer to the mirror 200).

An image signal $f_1(t)$ obtained when this projected composite image is scanned in the direction of the arrow M can be expressed as, $$f_1(t) = h_1(t) + k \cdot h_1(t - \Delta t) + k^2 \cdot g(h_1(t - 2\Delta t)) + \quad (27)$$
$$k^3 \cdot g \circ g(h_1(t - 3\Delta t)) + \ldots$$

In the function 27, the term $h_1(t)$ represents an image signal of an image projected by the primary reflected rays $A_1$ when the image is rear-focused by Δl/2. Further, since the object image point to which the secondary rays $A_2$ converge is front-focused by Δl/2, an image signal of such the image can be expressed as $k \cdot h_1(t-\Delta t)$ as in the case of the image focused at the point $P_1$ (rear-focused). Similarly, the third term, $k^2 \cdot g\{h_1(t-2\Delta t)\}$ represents an image projected only by the third order of reflected rays $A_3$; and the forth term, $k^3 \cdot g \circ g\{h_1(t-3\Delta t)\}$, by the fourth order of reflected rays $A_4$. Terms which represent image signals projected by the fifth and higher order of reflected rays, $A_n$, can be expressed similarly as above.

Figure 23:
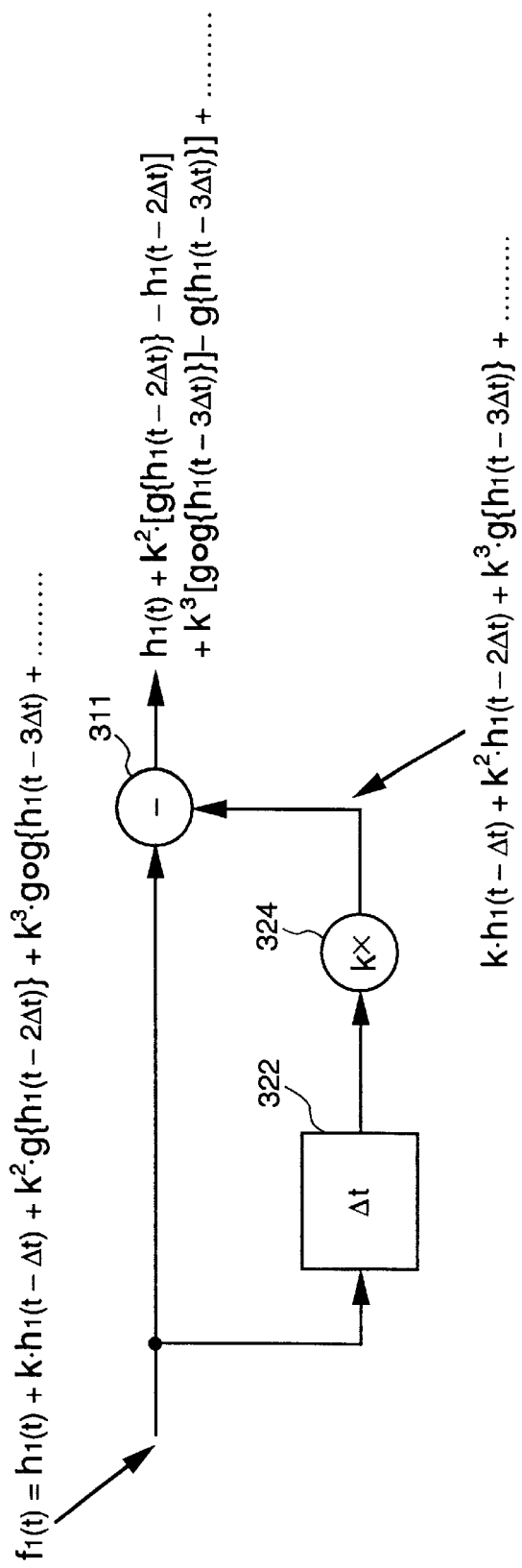
FIG. 23 is a block diagram illustrating a configuration of a filter 220 according to the second embodiment.
Figure 27:
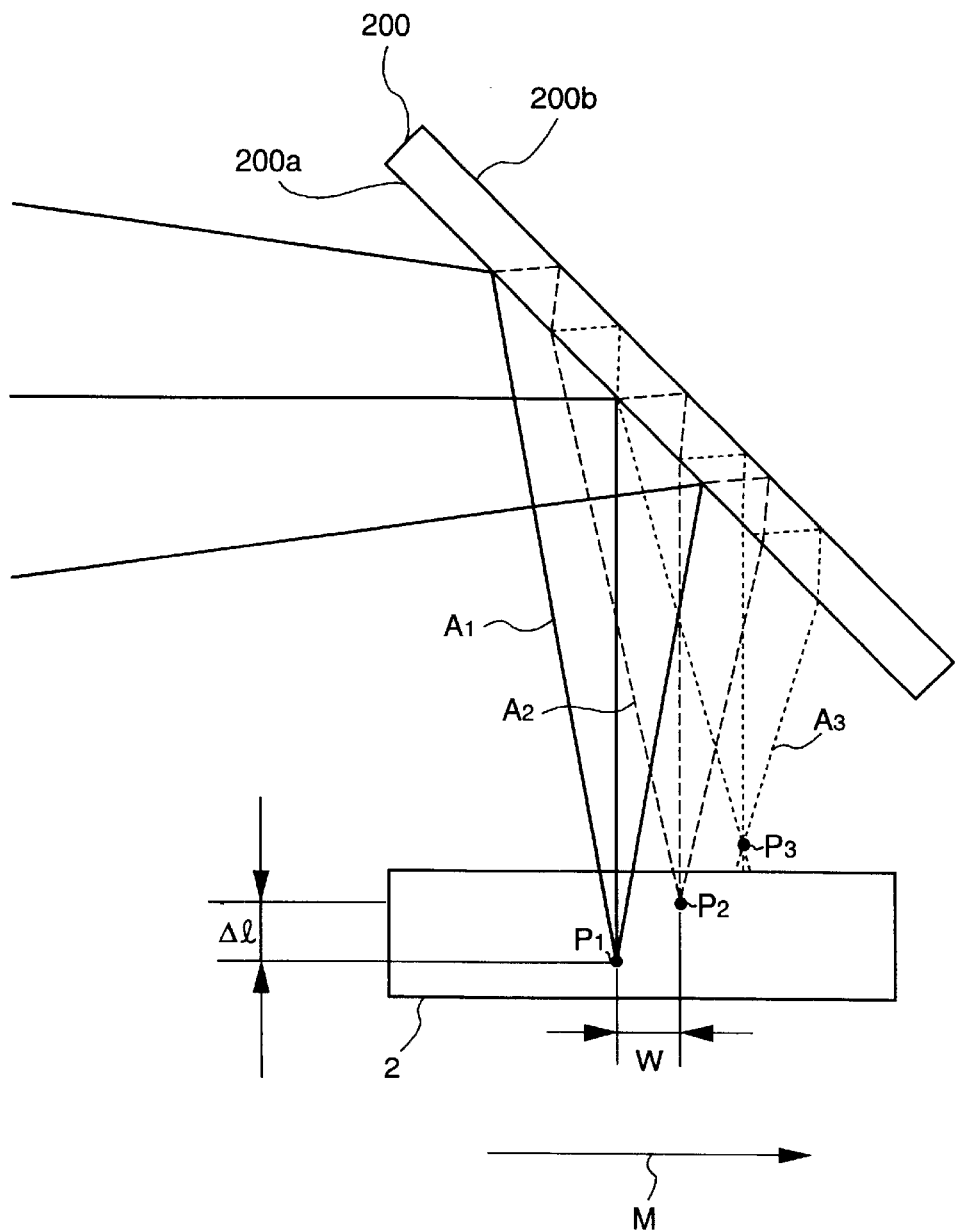

The signal $h_1(t)$ in the function 27 can be obtained by inputting the signal $f_1(t)$ to a non-recursive filter shown in FIG. 23. In FIG. 23, reference numeral 311 denotes a subtractor; 312, a delay circuit for delaying an input signal for Δt; and 314, a multiplier. When the signal $f_1(t)$ shown in FIG. 27 is inputted to the delay circuit 312, it is delayed for Δt and outputted to the multiplier 314, where it is multiplied by k, thus becomes a signal $f_{1d}(t)$. Here, $f_{1d}(t)$ can be expressed as, $$f_{1d}(t) = k \cdot h_1(t - \Delta t) + k^2 \cdot h_1(t - 2\Delta t) + \quad (28)$$
$$k^3 \cdot g(h_1(t - 3\Delta t)) + \ldots$$

The first term in the right-hand side of the function 28 is a signal corresponding to the image signal based on the secondary rays shown as the second term of the aforesaid equation 27. By subtracting the output $f_{1d}(t)$ from the original input signal $f_1(t)$ by the subtractor 311, the output from the subtractor 311, i.e., $f_1(t) - f_{1d}(t)$ is, $$f_1(t) - f_{1d}(t) = h_1(t) + k^2 \cdot [g\{h_1(t - 2\Delta t)\} - \quad (29)$$
$$h_1(t - 2\Delta t)] + k^3 \cdot [g \circ g\{h_1(t - 3\Delta t)\} -$$
$$g\{h_1(t - 3\Delta)\}] + \ldots$$

Since k is a small value, it is possible to consider $k_2$ and $k_3 \ll 1$. Therefore, the terms including the higher order of k in the function 29, namely the second and greater terms, are negligible. Accordingly, it is possible to substantially extract the image signal $h_1(t)$ of the image projected only by the primary reflected rays by the subtractor 311.

If the non-recursive filter shown in FIG. 23 is equipped in the filter 220 of the image sensing apparatus (FIG. 20), then the filter 220 can cancel almost all the image signals of images projected by the secondary or higher order of reflected rays, $A_n(n \geq 2)$, from the composite image signal on which all the images projected by each reflected rays are superposed. As a result, it becomes possible to distill the image signal $h_1(t)$ of the image projected only by the primary reflected rays $A_1$ out of the original composite image signal $f_1(t)$ <Object Image Point Control> . . . Second Embodiment When the image formation state of each of projected images is as shown in FIG. 21, the output $h_0'(t)$ from the filter 220 (shown in FIG. 23) is, $$h_0'(t) = f_0(t) - k \cdot f_0(t - \Delta t) \quad (30)$$
$$= h_0(t) + k \cdot [g\{h_0(t - \Delta t)\} - h_0(t - \Delta t)] +$$
$$k^2 \cdot [g \circ g\{h_0(t - 2\Delta t)\} - g(h_0(t - 2\Delta t))] +$$
$$k^3 \cdot [g \circ g \circ g\{h_0(t - 3\Delta t)\} -$$
$$g \circ g\{h_0(t - 3\Delta t)\}] + \ldots$$

Assuming that $k^2$ and $k^3 \ll 1$, then the third or greater terms in the above equation 30 become negligible. Accordingly, the equation 30 can be expressed as, $$h_0'(t) = f_0(t) - k \cdot f_0(t - \Delta t) \quad (31)$$
$$= h_0(t) + k \cdot [g\{h_0(t - \Delta t)\} - h_0(t - \Delta t)]$$

In the function 31, the term inside of the square brackets [ ] of the second term in the right-hand side represents only high-frequency components included in the image signal of a focused image, since an image signal $h_0(t-\Delta t)$ of the focused image is subtracted from an image signal $g\{h_0(t-\Delta t)\}$ of an image defocused by Δl. Therefore, under the image formation example 6 as shown in FIG. 24, the output from the filter 220 in the second embodiment includes more high-frequency components than the output from the filter 210.

In the second embodiment, the outputs from the filters 210 and 220 are inputted into the BPFs 13 and 14, respectively. As in the first embodiment, the BPFs 13 and 14 extracts high-frequency components from the outputs from the filters 210 and 220, respectively. Further, similarly to the first embodiment, the detectors 15 and 16 obtains outputs $D_3$ and $D_4$ which correspond to powers of the high frequency components of the outputs from the BPFs 13 and 14, respectively.

Therefore, when each image projected by each reflected rays is in the image formation state as shown in FIG. 24, $D_3 < D_4$.

Figure 25:
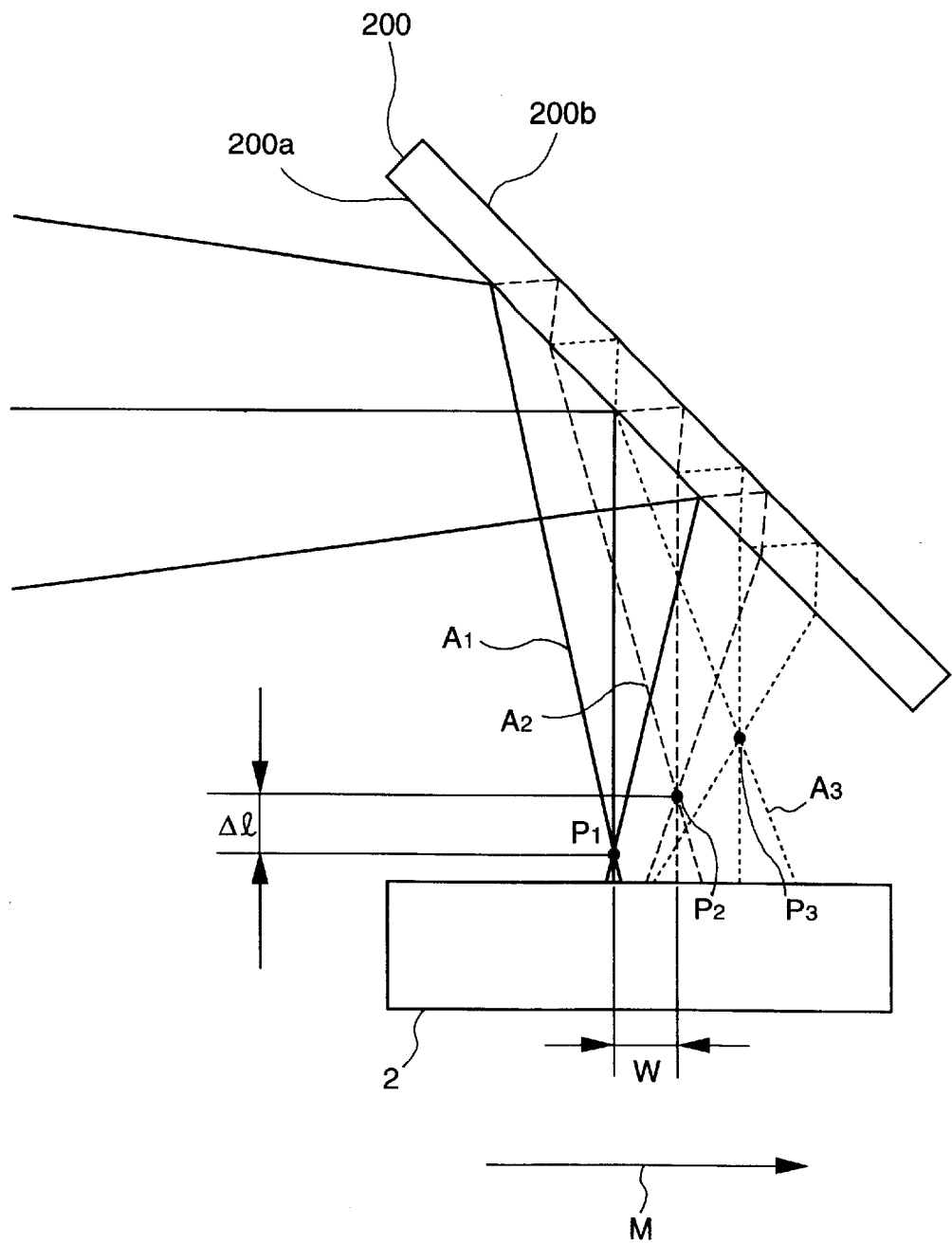

There would be a case where each order of reflected rays forms an image in the image formation state as shown in FIG. 25. In the states as shown in FIG. 25, an image projected by the primary reflected rays $A_1$ is front-focused, and images projected by the secondary reflected rays $A_2$ is further front-focused. In this case, too, an output from the filter 220 contains more high-frequency components than an output from the filter 210, thus, $D_3 < D_4$.

Now, in contrast with the image formation example 6 shown in FIG. 21, in a case of an image formation example 7 shown in FIG. 24, an output from the filter 220 can be expressed by the aforesaid $h_1(t)$, while the output $h_1'(t)$ from the filter 220 is expressed as, $$h_1'(t) = f_1(t) - k \cdot g\{f_1(t - \Delta t)\} \quad (32)$$

$$= h_1(t) + k \cdot [h_1(t - \Delta t) - g\{h_1(t - \Delta t)\}] +$$

$$k^2 \cdot [g\{h_1(t - 2\Delta t)\} - g \circ g\{h_1(t - 2\Delta t)\}] +$$

$$k^3 \cdot [g \circ g\{h_1(t - 3\Delta t)\} -$$

$$g \circ g \circ g\{h_1(t - 3\Delta t)\}] + \ldots$$

When $k^2$ and $k^3 \ll 1$ is considered, the terms including higher order of k, namely the third and greater terms in the right-hand side of the function 32 are negligible. Thus, the equation 32 can be simplified to, $$h'_1(t) = h_1(t) + k \cdot [h_0(t-\Delta t) - g\{h_0(t-\Delta t)\}] \quad (33)$$

The second term in the right-hand side of the equation 33 represents an difference obtained by subtracting an image signal corresponding to an image obtained by defocusing a $\Delta l/2$-defocused image by $\Delta l$, $g\{h_0(t-\Delta t)\}$ from an image signal of an image defocused by $\Delta l/2$, $h_0(t-\Delta t)$. Consequently, the $h_1'(t)$ shows high-frequency components included in the image defocused by $\Delta l/2$. Therefore, in the image formation states as shown in FIG. 24, an output from the filter 210 according to the second embodiment includes more high-frequency components then an output from the filter 220. Thus, the outputs from the detectors 15 and 16 under the image formation states as shown in FIG. 24 have a relationship of, $D_3 > D_4$.

Figure 26:
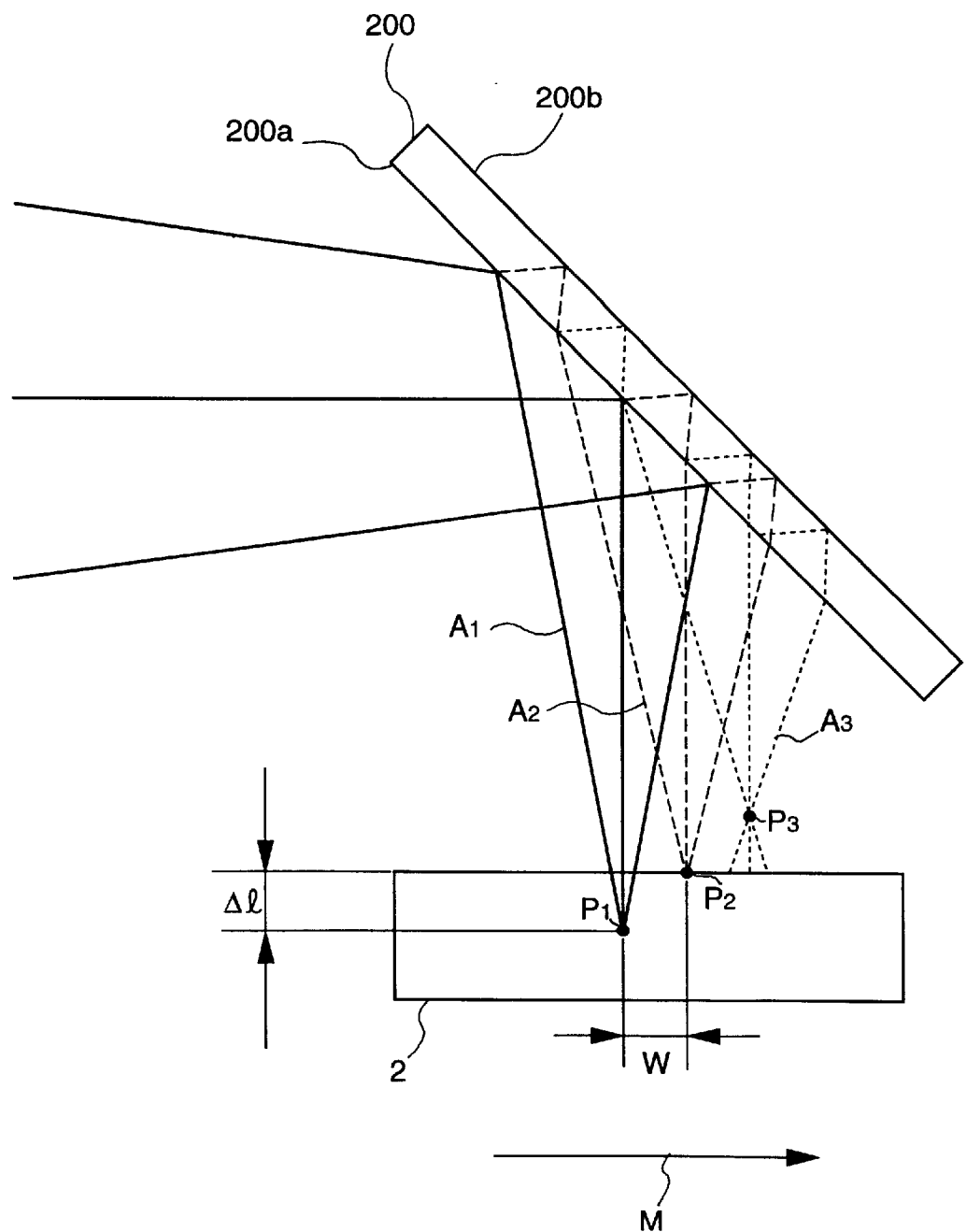

The image formation states shown in FIG. 26 is that an image projected by the secondary reflected rays $A_2$ is focused at the point $P_2$ on the photosensing surface of the image sensor 2, while an image projected by the primary reflected rays $A_1$ is focused at the point $P_1$ which is apart from the photosensing surface of the image sensor 2 by $\Delta l$ on the optical axis in the receding direction from the mirror 200. When the projected composite image is scanned in the direction of the arrow M, then an image signal $f_2(t)$ can be expressed as, $$f_2(t) = g\{h_0(t)\} + k \cdot h_0(t - \Delta t) + k^2 \cdot g\{h_0(t - 2\Delta t)\} + \quad (34)$$

$$k^3 \cdot g \circ g\{h_0(t - 3\Delta t)\} + \ldots$$

In this case, the output $h_2(t)$ from the filter 220 is, $$h_2(t) = f_2(t) - k \cdot f_2(t - \Delta t) \quad (35)$$

$$= g\{h_0(t)\} + k \cdot [g\{h_0(t - \Delta t)\} - h_0(t - \Delta t)] +$$

$$k^2 \cdot [g \circ g\{h_0(t - 2\Delta t)\} - g\{h_0(t - 2\Delta t)\}] +$$

$$k^3 \cdot [g \circ g \circ g\{h_0(t - 3\Delta t)\} - g \circ g\{h_0(t - 3\Delta t)\}] + \ldots$$

When $k^2$ and $k^3 \ll 1$ is considered, the terms including higher order of k, namely the third and greater term in the right-hand side of the function 35 are negligible. Thus, the equation 35 can be simplified to, $$h_2(t) = g\{h_0(t)\} + k \cdot [g\{h_0(t-\Delta t)\} - h_0(t-\Delta t)] \quad (36)$$

The term inside of the square brackets [ ] in the second term in the right-hand side of the equation 36 represents a difference obtained by subtracting an image signal $h_0(t-\Delta t)$ of a focused image from an image signal $g\{h_0(t-\Delta t)\}$ of an image defocused by $\Delta l$. Consequently, the $h_2(t)$ shows high-frequency components included in the focused image.

Regarding the output $h_2'(t)$ from the filter 210, since terms including second and higher order of k are canceled, thus, $$h'_2(t) = g\{h_0(t)\} + k \cdot [h_0(t-\Delta t) - g \circ g\{h_0(t-\Delta t)\}] \quad (37)$$

The term inside of the square brackets [ ] in the second term in the right-hand side of the equation 37 represents an difference obtained by subtracting an image signal $g \circ g\{h_0(t-\Delta t)\}$ corresponding to an image obtained by defocusing a $\Delta l$-defocused image by $\Delta l$ from an image signal $h_0(t-\Delta t)$ of a focused image. Consequently, the $h_2'(t)$ shows more high-frequency components included in the focused image.

Figure 28:
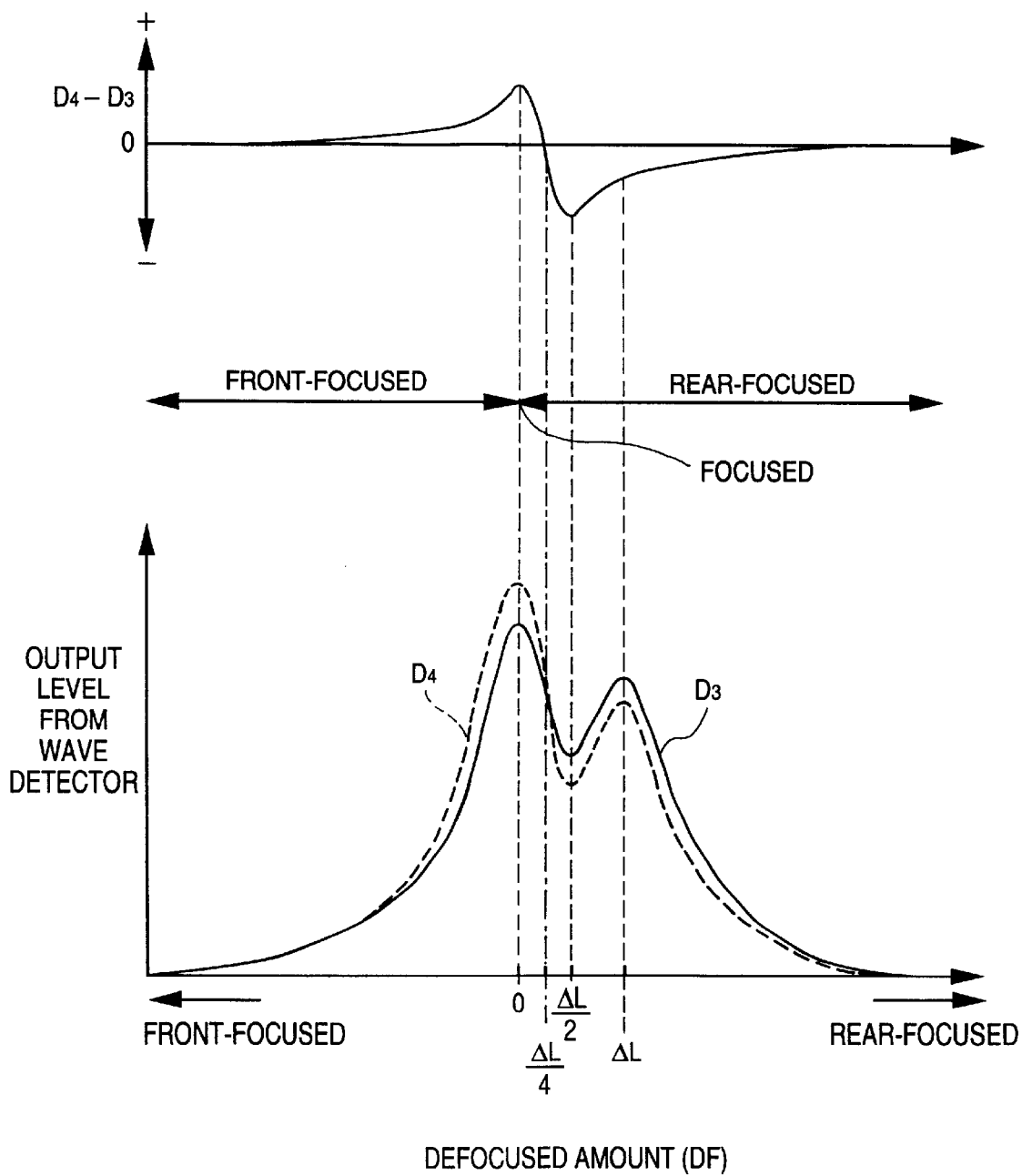
FIG. 28 is a graph showing a relationship between a defocused amount DF of an ordinary ray and output levels ($D_1$, $D_2$) from detectors according to the second embodiment.

Therefore, in the image formation states as shown in FIG. 24, the output from the filter 210 in the second embodiment contains more high-frequency components than the output from the filter 220. Accordingly, relationship between the outputs from the detectors 15 and 16 is, $D_3 > D_4$ This relationship holds in a case where an image projected by the secondary rays $A_2$ is further rear-focused, and an output from the filter 210 includes more high-frequency components than an output from the filter 220. Thus, the relationship of them can be also written as, $D_3 > D_4$ FIG. 28 depicts how the output signals $D_3$ and $D_4$ outputted from the focus adjusting apparatus according to the second embodiment and the difference between $D_3$ and $D_4$, namely $D_4 - D_3$, change accordingly. If the defocused amount DF is in the range of $0 < DF < \Delta l/4$, then an image can be substantially considered to be in the focused state, as in the first embodiment. Then, If $D_3 > D_4$, then the image is determined to be rear-focused, and the lens 1 is moved in the direction toward the position corresponding to infinity, whereas If $D_3 < D_4$, then the image is determined to be front-focused, then the lens 1 is moved in the direction toward the position corresponding to the nearest object position which can be focused. Note, operational sequence of controlling the microcomputer according to the first embodiment can be applied to the second embodiment without changing it substantially.

The mirror 200 generates a multiple of reflected rays which project on the CCD 2. This requires a non-recursive filter in the filters 210, 220.

According to the second embodiment as described above, the automatic focus adjusting operation can be performed speedily and smoothly. Further, it is unnecessary to perform the wobbling operation, it is possible to obtain an image of high quality even near the object image point. Furthermore, a lens driving system does not have to wobble, thereby capable of configuring a relatively small apparatus at low cost, since high driving velocity, high driving torque and high driving precision are not required.

Accordingly, the image sensing apparatus and the automatic focus adjusting apparatus according to the second embodiment can maintain the advantages provided by the apparatuses according to the first embodiment.

As many apparently widely different embodiments of the present invention can be made without departing from the spirit and scope thereof, it is to be understood that the invention is not limited to the specific embodiments thereof except as defined in the appended claims.

What is claimed is:

1. A focus adjusting apparatus which performs focus adjustment by controlling an optical image formation system, comprising:
   a birefringent plate made of a uniaxial crystal which separates incoming light from an object into ordinary rays and extraordinary rays, the rays including all color components of the light, converging at different focal points from the birefringent plate in a direction of an optical axis;
   a polarizing plate, provided in front of the bireflingent plate, for controlling polarization direction of light wherein the light from the object is polarized by said polarizing plate and enters the bireflingent plate;
   an image sensor, provided behind said birefringent plate which senses said ordinary and extraordinary rays and converts them into an image signal and which is arranged so that the optical axis of the ordinary rays from said birefringent plate is normal to the photosensing surface of the image sensor, and whereby the ordinary rays converge to a point which is closer to the birefringent plate than a point to which the extraordinary rays converge;
   first filtering means for filtering a first signal component out of a luminance signal of the image signal obtained by said image sensor and outputting a first value corresponding to an amount of the first signal component;
   second filtering means for filtering a second signal component, having a frequency different from the first signal component, out of the luminance signal of the image signal obtained by said image sensor and outputting a second value corresponding to an amount of the second signal component;
   judging means for judging a focus condition of an image projected on said image sensor by comparing the first value with the second value, and
   control means for controlling the optical system to adjust the focus condition in accordance with a signal outputted from said judging means.

2. A focus adjusting apparatus which performs focus adjustment by controlling an optical image formation system, comprising:
   a birefringent plate made of a uniaxial crystal which separates incoming light from an object into ordinary rays and extraordinary rays, the rays including all color components of the light, converging at different focal points from the birefringent plate in a direction of an optical axis;
   a polarizing plate, provided in front of the birefringent plate, for controlling polarization direction of light, wherein the light from the object is polarized by said polarizing plate and enters the birefringent plate;
   an image sensor, provided behind said birefringent plate, which senses said ordinary and extraordinary rays and converts them into an image signal and which is arranged so that the optical axis of the ordinary rays from said birefringent plate is normal to the photosensing surface of the image sensor, and whereby the extraordinary rays converge to a point which is closer to the birefringent plate than a point to which the ordinary rays converge;
   first filtering means for filtering a first signal component out of a luminance signal of the image signal obtained by said image sensor and outputting a first value corresponding to an amount of the first signal component;
   second filtering means for filtering a second signal component, having a frequency different from the first signal component, out of the luminance signal of the image signal obtained by said image sensor and outputting a second value corresponding to an amount of the second signal component;
   judging means for judging a focus condition of an image projected on said image sensor by comparing the first value with the second value, and
   control means for controlling the optical system to adjust the focus condition in accordance with a signal outputted from said judging means.

3. A focus adjusting apparatus which performs focus adjustment by controlling an optical image formation system, comprising:
   splitting means for splitting light coming from an object into at least two rays, each ray including all color components of the light, converging at different focal points from said splitting means in a direction of an optical axis;
   image sensing means, provided behind said splitting means, for sensing said at least two split rays and converting them into an image signal;
   first filtering means for filtering a first signal component out of a luminance signal of the image signal obtained by said image sensing means and outputting a first value corresponding to an amount of the first signal component;
   second filtering means for filtering a second signal component, having a frequency different from the first signal component, out of the luminance signal of the image signal obtained by said images sensing means and outputting a second value corresponding to an amount of the second signal component;
   judging means for judging a focus condition of an image projected on said image sensing means by comparing the first value with the second value, and
   control means for controlling the optical system to adjust the focus condition in accordance with a signal outputted from said judging means.
   wherein said first filtering means comprises, a subtractor which takes an image signal from said image sensing means as one input; a delay circuit for delaying the output from said subtractor for a time period required to scan a distance between corresponding points of images projected by said at least two rays on the photosensing surface of said image sensing means in the scanning direction by said image sensing means; a filtering circuit for transmitting frequency components of the signal delayed by said delay circuit, in a first frequency band; and a multiplier for multiplying the output from said filtering circuit by a predetermined gain, and wherein said first filtering means functions as a recursive filter by taking the output from said multiplier as the other input of said subtractor.

4. The focus adjusting apparatus according to claim 3, wherein the first frequency band of said filtering circuit is set to a low-frequency band corresponding to frequencies of signal components representing blurriness of an image projected by said at least two rays on the photosensing surface of said image sensing means, said blurriness being caused by the difference between the light paths.

5. The focus adjusting apparatus according to claim 3, wherein the gain used in the multiplier is set to an extinction ratio of one of said at least two rays split by said splitting means.

6. A focus adjusting apparatus which performs focus adjustment by controlling an optical image formation system, comprising:

splitting means for splitting light coming from an object into at least two rays, each ray including all color components of the light, converging at different focal points from said splitting means in a direction of an optical axis;

image sensing means, provided behind said splitting means, for sensing said at least two split rays and converting them into an image signal;

first filtering means for filtering a first signal component out of a luminance signal of the image signal obtained by said image sensing means and outputting a first value corresponding to an amount of the first signal component;

second filtering means for filtering a second signal component, having a frequency different from the first signal component, out of the luminance signal of the image signal obtained by said images sensing means and outputting a second value corresponding to an amount of the second signal component;

judging means for judging a focus condition of an image projected on said image sensing means by comparing the first value with the second value; and control means for controlling the optical system to adjust the focus condition in accordance with a signal outputted from said judging means, wherein said second filtering means comprises, a subtractor for taking an image signal from said image sensing means as one input; a delay circuit for delaying the output from said subtractor for a time period required to scan a distance between corresponding points of images projected by said at least two rays on the photosensing surface of said image sensing means in the scanning direction by said image sensing means; and a multiplier for multiplying the delayed signal in said delay circuit by a predetermined gain, and wherein said second filtering means functions as a recursive filter by taking the output from said multiplier as the other input of said subtractor.

7. The focus adjusting apparatus according to claim 6, wherein a first frequency band of said filtering circuit is set to a low-frequency band corresponding to the frequencies of signal components representing blurriness of an image projected by said at least two rays on the photosensing surface of said image sensing means, the blurriness being caused by the difference between the light paths.

8. The focus adjusting apparatus according to claim 6, wherein the gain used in the multiplier is set to an extinction ratio of one of said at least two rays split by said splitting means.

9. A focus adjusting apparatus which performs focus adjustment by controlling an optical image formation system, comprising:

splitting means for splitting light coming from an object into at least two rays, each ray including all color components of the light, converging at different focal points from said splitting means in a direction of an optical axis;

image sensing means, provided behind said splitting means, for sensing said at least two split rays and converting them into an image signal;

first filtering means for filtering a first signal component out of a luminance signal of the image signal obtained by said image sensing means and outputting a first value corresponding to an amount of the first signal component;

second filtering means for filtering a second signal component, having a frequency different from the first signal component, out of the luminance signal of the image signal obtained by said images sensing means and outputting a second value corresponding to an amount of the second signal component;

judging means for judging a focus condition of an image projected on said image sensing means by comparing the first value with the second value; and control means for controlling the optical system to adjust the focus condition in accordance with a signal outputted from said judging means, wherein the scanning direction of said image sensing means is set so that an image to be focused projected by one of said at least two rays is scanned prior to an image projected by other rays.

* * * * *

UNITED STATES PATENT AND TRADEMARK OFFICE
CERTIFICATE OF CORRECTION

PATENT NO. : 6,654,061 B2
DATED : November 25, 2003
INVENTOR(S) : Kunihiko Yamada It is certified that error appears in the above-identified patent and that said Letters Patent is hereby corrected as shown below:

Column 6,
Line 65, insert -- , -- after "polarized"

Column 9,
Line 6, delete "period at" and insert therefor -- period. At --
Line 58, delete "g·$h_o(t-\Delta t)$}" and insert therefor -- g{$h_o(t-\Delta t)$} --

Column 14,
Line 15, delete "δ" and insert therefor -- 8 --
Line 47, delete "then" and insert therefor -- than --

Column 18,
Line 45, delete "forth" and insert therefor -- fourth --

Column 19,
Line 48, delete "$k^3$·$g°g$ ($h_1(t-3\Delta t)$) + ..." and insert therefor -- $k^3$·$g°g${$h_1(t-3\Delta t)$} + ... --
Line 59, delete "forth" and insert therefor -- fourth --

Column 20,
Line 9, delete "$k^3$·g($h_1(t-3\Delta t)$} + ... " insert therefor -- $k^3$·g{($h_1(t-3\Delta t)$} + ... --
Line 21, delete "g($h_1(t-3\Delta)$}]+ ..." insert therefor -- g{$h_1(t-3\Delta)$}]+ ... --
Line 49, delete "$k^2$·[$g°g${$h_o(t-2\Delta t)$} - g($h_o(t-2\Delta t)$}] + ..." insert therefor -- $k^2$·[$g°g${$h_o(t-2\Delta t)$} - g{$h_o(t-2\Delta t)$}] + ... --

Column 21,
Line 55, delete "then" and insert therefor -- than --

Column 23,
Line 34, delete "bireflingent" and insert therefor -- birefringent --
Line 37, delete "bireflingent" and insert therefor -- birefringent --

UNITED STATES PATENT AND TRADEMARK OFFICE
CERTIFICATE OF CORRECTION

PATENT NO. : 6,654,061 B2
DATED : November 25, 2003
INVENTOR(S) : Kunihiko Yamada It is certified that error appears in the above-identified patent and that said Letters Patent is hereby corrected as shown below:

Column 24,
Line 64, delete "judging means." and insert therefor -- judging means, --

Signed and Sealed this

Twenty-eighth Day of June, 2005

JON W. DUDAS
*Director of the United States Patent and Trademark Office*